US011747130B2

(12) United States Patent
Ausserlechner

(10) Patent No.: US 11,747,130 B2
(45) Date of Patent: Sep. 5, 2023

(54) INDUCTIVE ANGLE SENSOR WITH STRETCHED COILS

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 138 days.

(21) Appl. No.: 17/331,978

(22) Filed: May 27, 2021

(65) Prior Publication Data

US 2021/0381817 A1    Dec. 9, 2021

(30) Foreign Application Priority Data

Jun. 9, 2020 (DE) .................. 102020207225.6

(51) Int. Cl.
*G01D 5/20*      (2006.01)
*G01B 7/30*      (2006.01)

(52) U.S. Cl.
CPC .............. *G01B 7/30* (2013.01); *G01D 5/204* (2013.01); *G01D 5/2006* (2013.01)

(58) Field of Classification Search
CPC . G01B 7/30; G01B 7/00; G01B 11/26; G01B 11/00; G01B 3/56; G01B 5/24; G01B 13/18; G01B 21/22; G01D 5/142; G01D 5/16; G01D 5/00; G01D 5/20; G01D 5/204; G01D 5/2006; G01D 2205/90; G01D 5/34792; G01D 5/2451; G01D 5/34738; G01D 5/24485; B23Q 17/22; H02K 11/21; H02K 7/003; H03M 1/645; H03M 1/00; H03M 1/22; H03M 1/26; H03M 1/301; H03M 1/305; H03M 1/485; H03M 1/0617; H03M 1/1066; H03M 1/143; H03M 1/161;
(Continued)

(56) References Cited

U.S. PATENT DOCUMENTS 5,430,372 A    7/1995   Hecht
10,330,498 B2    6/2019   Leidich et al.
(Continued)

FOREIGN PATENT DOCUMENTS

DE            4243022 C2    7/2000
DE    102009054694 A1    7/2010
DE    102014220454 A1    4/2016
(Continued)

*Primary Examiner* — Son T Le
(74) *Attorney, Agent, or Firm* — Harrity & Harrity, LLP

(57) ABSTRACT

An inductive angle sensor includes a stator component and a rotor component that is rotatable relative thereto about an axis of rotation. The rotor component has an inductive target with k-fold symmetry. The stator component has a first single pickup coil with k-fold symmetry and a second single pickup coil with the same k-fold symmetry. The first single pickup coil is rotated around the axis of rotation in relation to the second single pickup coil. The inductive target is stretched along a first axis that runs perpendicularly to the axis of rotation so that a contour outline, as seen in plan view, of the inductive target has an elliptical shape, and the first single pickup coil is stretched along a second axis that runs perpendicularly to the axis of rotation so that a contour outline, as seen in plan view, of the first single pickup coil has an elliptical shape.

21 Claims, 14 Drawing Sheets

(58) Field of Classification Search
CPC ........ H03M 1/30; H03M 1/303; H03M 1/308; H03M 1/50; H03M 1/64; G01P 15/08
See application file for complete search history.

(56) References Cited

U.S. PATENT DOCUMENTS

2010/0176803 A1    7/2010  Ausserlechner
2018/0224301 A1*  8/2018  Herrmann .............. G01D 5/204

FOREIGN PATENT DOCUMENTS

| | | |
|---|---|---|
| DE | 102015220617 A1 | 4/2017 |
| WO | 2019226879 A1 | 11/2019 |

\* cited by examiner

INDUCTIVE ANGLE SENSOR WITH STRETCHED COILS

FIELD

The present disclosure relates to an inductive angle sensor, and in particular an inductive angle sensor with an elliptical inductive target and at least one elliptical single pickup coil or at least one elliptical pickup coil arrangement.

BACKGROUND

Inductive angle sensors normally have a stator and a rotor that is rotatable relative thereto. The stator can be configured, for example, as a printed circuit board, PCB for short. A field coil can be arranged on the PCB. The field coil is fed an input signal, for example an AC signal. In response thereto, the field coil generates a magnetic field that decouples from the field coil. The rotor opposite has an inductive target that the magnetic field couples into. In response thereto, the inductive target produces eddy currents that in turn generate a secondary magnetic field that decouples from the inductive target. The secondary magnetic field then couples into a pickup coil arrangement that is arranged on the stator. In response thereto, the pickup coil arrangement generates an output signal that represents the angle between the stator and the rotor.

In these conventional angle sensors, the target has a k-fold symmetry, and the single pickup coils of a pickup coil arrangement have a matching k-fold symmetry. A k-fold symmetry is understood to mean a form of rotational symmetry. A body has a k-fold symmetry if it can be rotated through 360°*n/k about an axis, so that it has the same appearance after rotation as before rotation (where n is an arbitrary whole number (integer)). This leads to the inductive angle sensor having a k-fold period, i.e. while the stator executes a complete revolution through 360° relative to the rotor (so-called mechanical angle domains), the target on the rotor sweeps over the turns of the k-fold pickup coil k times and therefore generates an angle signal in the so-called electrical angle domain k times. This angle signal is the same angle signal in the electrical angle domain k times.

As a result, the problem arises in conventional inductive angle sensors that no unambiguous angle values in the electrical angle domain are output for a complete revolution of 360° in the mechanical angle domain. Instead, unambiguous values occur only in the region of 360°/k. For example, an inductive angle sensor, which has coils with a 3-fold symmetry (k=3), always outputs the same values every 360°/3=120°, i.e. the same angle values (in the electrical angle domain) are output for mechanical angle values in the interval [0°; 120° ] and in the interval [120°; 240° ] and in the interval [240°; 360° ].

In order to counteract this circumstance, inductive angle sensors that operate in accordance with the Vernier principle are known. Two coils with different k-fold symmetry (e.g. k=5 and k=6) are used here. Angle sensors of this kind likewise require two inductive targets with likewise different k-fold symmetry. However, these inductive targets have to be configured as coils. Even if the targets were configured as solid shaped metal parts, they would interfere with one another and the inductive sensor principle would no longer function properly in this case. However, with the configuration of the targets in the form of coils, the problem arises that said coils begin to vibrate at high rotational speeds of the rotor, this also leading, in turn, to angle errors. For example, in inductive angle sensors, the rotor may sometimes rotate at a speed of 360°/600 µs, this corresponding to a very high rotation speed of 100 000 revolutions per minute.

Accordingly, it would be desirable to provide an inductive angle sensor that avoids the abovementioned disadvantages of conventional angle sensors.

SUMMARY

Therefore, an inductive angle sensor is proposed. Exemplary embodiments and further advantageous aspects of this inductive angle sensor are cited in the appended claims.

Accordingly, an inductive angle sensor is proposed, that has, amongst other things, a stator component and a rotor component that is rotatable relative to said stator component about a common axis of rotation, wherein the rotor component has an inductive target with k-fold symmetry, and wherein the stator component has at least one first single pickup coil with k-fold symmetry and one second single pickup coil with k-fold symmetry. The first single pickup coil is rotated around the axis of rotation R in relation to the second single pickup coil. The inductive target is stretched along a first axis that runs perpendicularly to the axis of rotation, so that the contour outline, as seen in plan view, of the inductive target has an elliptical shape. In addition, at least the first single pickup coil is stretched along a second axis that runs perpendicularly to the axis of rotation, so that the contour outline, as seen in plan view, of the first single pickup coil has an elliptical shape.

BRIEF DESCRIPTION OF THE DRAWINGS

Some exemplary embodiments are illustrated by way of example in the drawing and are explained below. In the drawing.

DETAILED DESCRIPTION

Exemplary embodiments are described in more detail below with reference to the figures, wherein elements having the same or a similar function are provided with the same reference signs.

Where this description refers to a k-fold symmetry, this is understood to mean a form of rotational symmetry. A body has a k-fold symmetry if it can be rotated through 360°*n/k about an axis, so that it has the same appearance after rotation as before rotation (where n is an arbitrary whole number (integer)). In addition, in the present disclosure, a k-fold symmetry of the target and the coil in an angle sensor arrangement is distinguished in that, in the case of a k-fold symmetry, the signal that is induced in a coil (or target) remains identical if the coil (or the target) is rotated through 360°/k.

Within the meaning of the present disclosure, a k-fold symmetry is also a k-fold symmetry when it is interrupted, for example by features that have no influence on the signals induced (in a pickup coil arrangement). For example, the target could have parts or sections that are arranged so far radially on the outside of the target that no significant eddy current intensity is excited in them by the field coil (because the field coil would then be equally radially smaller), and/or that eddy currents do not make any significant contribution to the signal in the pickup coils in these radially outermost parts or sections of the target (because the pickup coils would then be equally radially smaller). This also applies to the k-fold symmetry of the single pickup coils or the pickup coil arrangements. That is to say, the k-fold symmetry can be determined substantially by that geometric shaping of the sections of the target and/or of the pickup coil arrangement (or of the single pickup coil) which contributes to the generation of signals by the inductive angle sensor by means of induction. Therefore, for example, a target and/or a pickup coil arrangement (or of a single pickup coil) would also have a k-fold symmetry even when a small projection were present on the outer edge of this target and/or of this pickup coil arrangement (or of this single pickup coil), said small projection influencing the external appearance and also the shaping of this target and/or of this pickup coil arrangement (or of this single pickup coil) but not having a substantial influence on the generation of signals by means of induction.

Where this description cites absolute values for angles, these absolute values also apply in a tolerance range of ±10% or of ±1°. That is to say, the innovative design described herein can still deliver satisfactory results even in the case of deviations in angles cited herein in a range of ±10% or of ±1°.

Figure 11A:
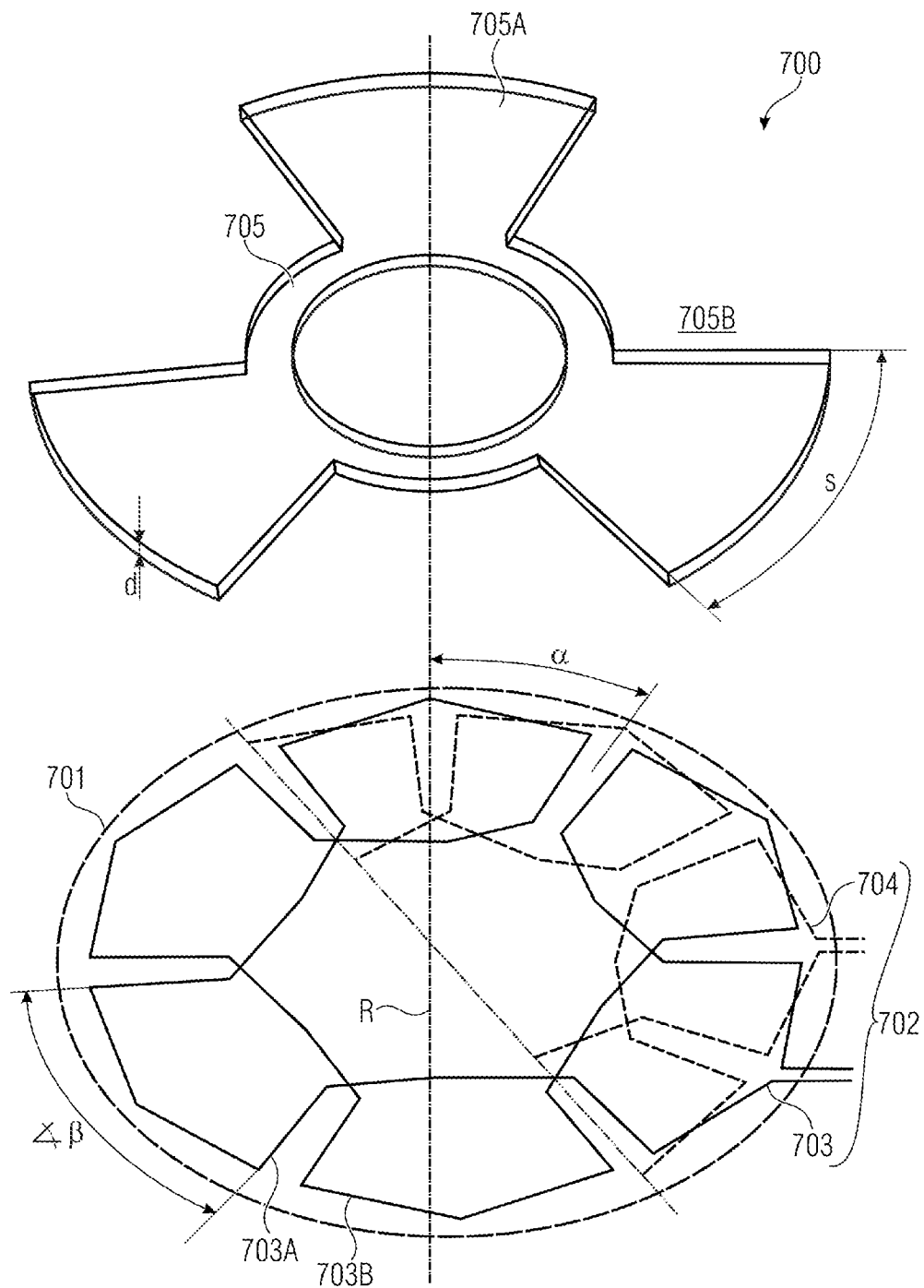
FIG. 11A shows a schematic view of an inductive angle sensor with two single pickup coils and a solid metal inductive target.

There will first be a discussion of an inductive angle sensor having a pickup coil arrangement with two single pickup coils by way of introduction to the problems faced here. FIG. 11A shows a schematic view of an inductive angle sensor 700 of this kind.

The angle sensor 700 has a field coil 701 and an individual pickup coil arrangement 702 with two single pickup coils 703, 704 that are offset with respect to another. The field coil 701 and the pickup coil arrangement 702 are typically arranged on a stator (not explicitly illustrated here). The angle sensor 700 further has an inductive target 705. The target 705 is typically arranged on a rotor (not explicitly illustrated here).

The target 705 can be manufactured from an electrically conductive material and produced, for example, as a punched-out shaped metal part having a thickness d. Instead of a solid shaped metal part, the target can also be configured in the form of rotor coils. In this case, the rotor coils could have substantially the geometric shape of the shaped metal part and be operated as shorted coils.

The target 705 can have a k-fold symmetry. In this example, the target 705 has a 3-fold symmetry with three teeth 705A and three gaps 705B in each case. The gaps 705B between the teeth 705A do not necessarily have to have the same shape as the teeth 705A themselves. The teeth 705A have a span s on the outer radius.

The single pickup coils 703, 704 on the stator can be adapted to match the inductive target 705 on the rotor. That is to say, the single pickup coils 703, 704 can have a k-fold symmetry that matches the k-fold symmetry of the target 705. In this example, the two single pickup coils 703, 704 each have a 3-fold symmetry. Although there are six turns for each single pickup coil 703, in each case two juxtaposed turns 703A, 703B are wound in opposite directions to one another. That is to say, the pickup coil arrangement 703 has to be rotated through 360°/3=120° (where k=3), in order that turns with the same winding direction are again situated opposite one another.

In the arrangement shown in FIG. 11A, the two single pickup coils 703, 704 depicted each have a 3-fold symmetry. Therefore, if one of the single pickup coils 703, 704 depicted here were to be rotated through 360°/6=60°, then although the respective conductor loops or turns thereof would be congruent again, the orientation sense (winding direction) of each single loop or single turn would be opposite in this case. The single pickup coil 703 therefore needs to be rotated through 360°/3=120° so that the single turns would be congruent again and also have the same orientation sense, so that the single pickup coil 703 accordingly also delivers the same signal again. Therefore, the two single pickup coils 703, 704 depicted thus have a 3-fold symmetry (i.e. k=3), even though at first glance they appear as though they would have a 6-fold symmetry (i.e. k=6).

This arrangement with two juxtaposed turns 703A, 703B with opposite winding directions serves to compensate for homogeneous external magnetic fields (interference fields) and also symmetrical interference fields of the field coil 701. Single pickup coils 703, 704 of this kind are therefore also referred to as astatic.

Astatic pickup coils are distinguished, inter alia, in that they have an even number of turns, wherein the even-numbered turns are wound in a first winding direction (e.g. clockwise) and the uneven-numbered turns respectively in between are wound in an opposite, second winding direction (e.g. counterclockwise). Given homogeneous interference magnetic fields, this now leads to the first half of an astatic single pickup coil 703 delivering a first signal and the second half of this astatic single pickup coil 703 delivering a second signal, wherein the second signal is inverted in relation to the first signal on account of the opposite winding direction. The same applies in this example to the second astatic single pickup coil 704 depicted here, the first half of which delivers a third signal in this example and the second half of which delivers a fourth signal inverted with respect thereto on account of the opposite winding direction. This inverted arrangement means that induced signals that can be attributed to spatially constant interference fields cancel one another out.

Each of the single pickup coils 703, 704 generates an appropriate output signal in response to the secondary magnetic field emanating from the target 705. These can be output voltage signals. These radio-frequency output signals are amplitude-modulated and vary with the current rotation position of the rotor relative to the stator. These amplitude-modulated RF signals can be demodulated. The demodulated LF signals of the two astatic single pickup coils 703, 704 are at least approximately sinusoidal or cosinusoidal, likewise again depending on the angle of rotation of the rotor relative to the stator. The astatic single pickup coils 703, 704 are therefore occasionally also referred to as sine pickup coil and cosine pickup coil. Sine and cosine are naturally arbitrarily interchangeable in this example.

The first and the second single pickup coil 703, 704 are also arranged in a manner offset through a geometric offset angle α with respect to one another. This offset angle is dependent, inter alia, on the variable k of the k-fold symmetry of the single pickup coils 703, 704.

The turns 703A, 703B of a respective single pickup coil 703 can also have a turn angle β.

The field coil 701 and the single pickup coils 703, 704 are arranged rotationally symmetrically around a common axis of rotation R. The field coil 701 is arranged annularly around the single pickup coils 703, 704 in this instance.

It should be stated once again here that the inductive angle sensor 700 depicted here therefore has a pickup coil arrangement 701 with multiple (here two) single pickup coils 703, 704 that are rotated around the axis of rotation R through a geometric offset angle α in relation to one another. Each single pickup coil 703, 704 has multiple turns 703A, 703B.

In order to operate the inductive angle sensor 700, the field coil 701 can have, for example, a sinusoidal voltage of approximately 1 V applied to it at a frequency of 4 MHz. This generates an alternating magnetic field (primary magnetic field) in the target 705, which field in turn produces eddy currents in the target. These eddy currents for their part in turn generate a magnetic field (secondary magnetic field) that couples into the single pickup coils 703, 704 and generates corresponding electrical voltages there. The voltages of the respective single pickup coils 703, 704 are measured. Since the voltage values are dependent on the position of the rotor relative to the stator, this can serve as a measure of the rotation angle between the rotor and the stator. These are amplitude-modulated signals, i.e. they have a carrier frequency of 4 MHz in this case, but the amplitude thereof varies with the position of the rotor relative to the stator.

Figure 11B:
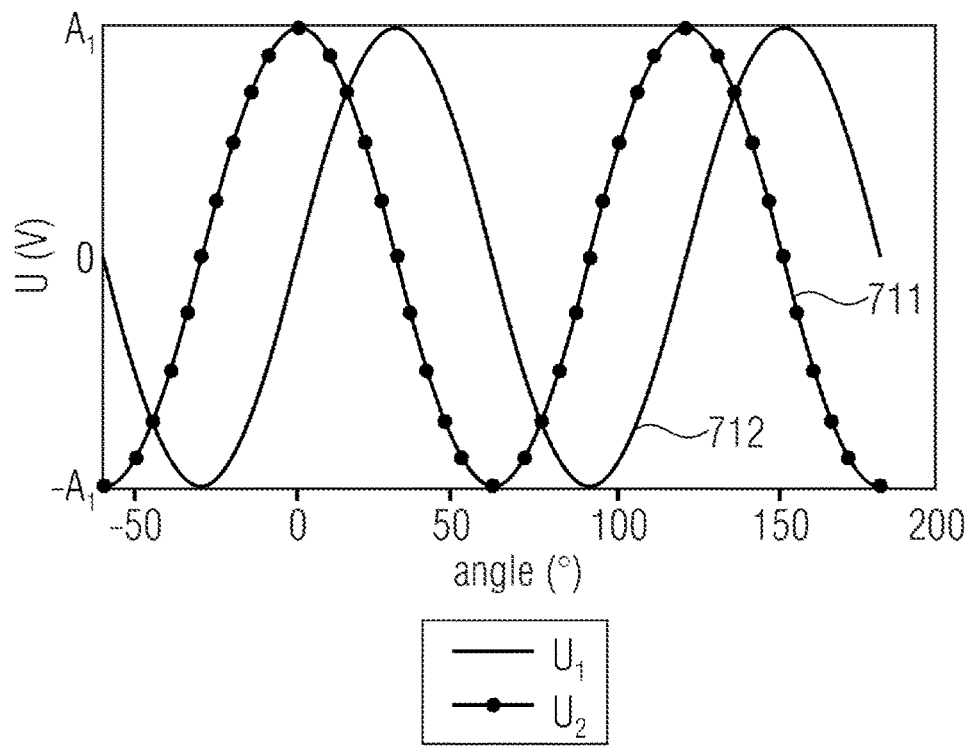
FIG. 11B shows two demodulated LF signals that originate from the two single pickup coils from FIG. 11A.

The envelope of these amplitude-modulated RF signals can be ascertained, for example, by means of demodulation of the RF signals, for example using a phase-synchronous or else a phase-asynchronous demodulator. These envelopes, i.e. the demodulated LF signals 711, 712, are shown in FIG. 11B. The envelopes 710, 711 have a phase offset relative to one another that results from the offset or rotated arrangement of the two single pickup coils 703, 704 with respect to one another. The envelopes 710, 711 represent the rotation angle of the rotor relative to the stator in the electrical angle domain. The position of the rotor relative to the stator can be calculated from the two envelopes 710, 711 using an arctangent function, this leading to the result depicted in FIG. 11C.

Figure 11C:
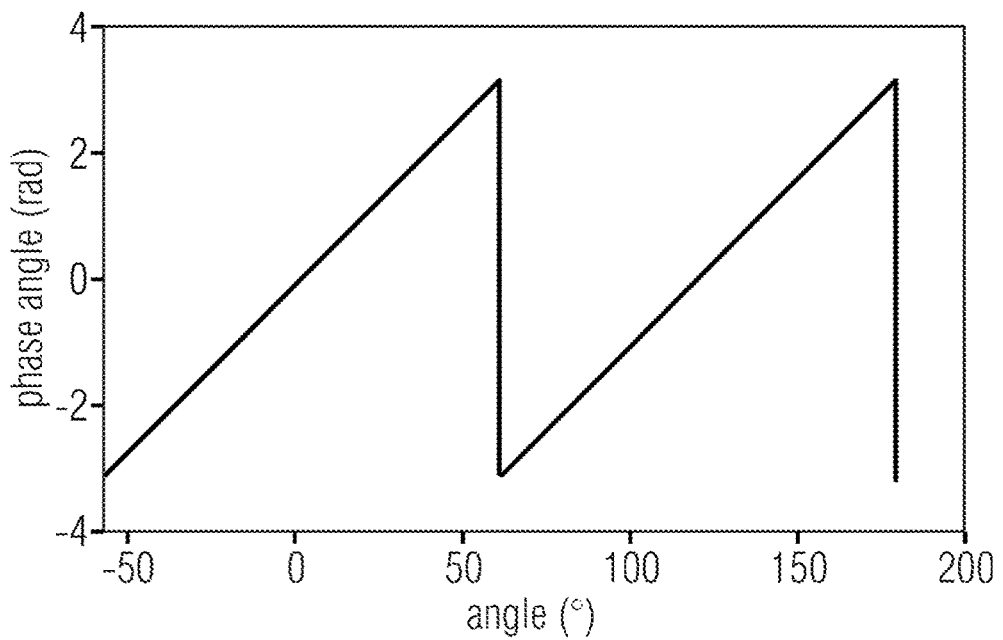
FIG. 11C shows an electrical signal calculated from the two LF signals from FIG. 11B using an arctangent function.

The disadvantage mentioned at the outset when determining the rotation position of the rotor relative to the stator can be seen in FIGS. 11B and 11C. Given the 3-fold symmetry shown by way of example here, the angle signal in the electrical angle domain has a period of 360°/3=120°. Therefore, ambiguities in determining the rotor position, i.e. the rotation position of the rotor relative to the stator, occur every 120°.

Figure 12:
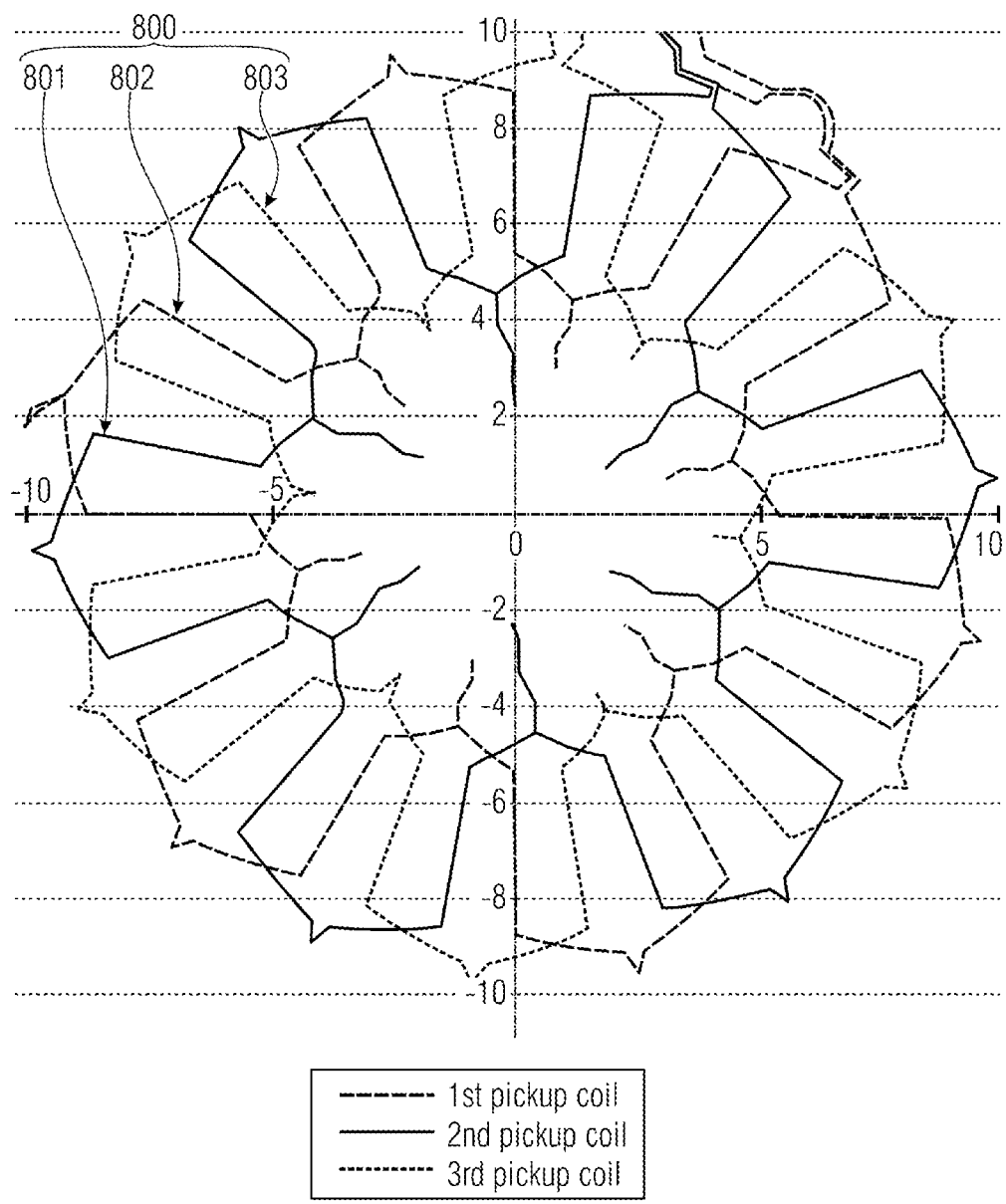
FIG. 12 shows a schematic plan view of a pickup coil arrangement with three single pickup coils.

In addition to the astatic single pickup coils described up to this point, so-called non-astatic single pickup coils are also covered in this disclosure. FIG. 12 shows an example of a non-astatic pickup coil arrangement 800 with three non-astatic single pickup coils 801, 802, 803 arranged rotated with respect to one another.

The single pickup coils 801, 802, 803 can have a substantially identical geometric shape. The single pickup coils 801, 802, 803 are also arranged rotated through an angle of rotation α in relation to one another. As was mentioned at the outset, the angle of rotation α depends, inter alia, on the k-fold symmetry of the single pickup coils 801, 802, 803. The non-astatic single pickup coils 801, 802, 803 shown here have a 6-fold symmetry (k=6). Given an uneven number of single pickup coils, the offset angle α is calculated as: α=360°/k/3. Therefore, in the example shown here, in each case two adjacent single pickup coils are offset through α=360°/6/3=20° with respect to one another. That is to say, the second single pickup coil 802 is rotated through 20° in relation to the first single pickup coil 801, and the third single pickup coil 803 is rotated through 20° in relation to the second single pickup coil 802. The third single pickup coil 803 is therefore rotated through 40° in total in relation to the first single pickup coil 801.

Purely for the sake of completeness, it should be mentioned at this point that the determination of the angle of rotation α differs depending on how many single pickup coils a pickup coil arrangement has and, respectively, depending on how many signals that are phase-shifted with respect to one another the respective pickup coil arrangement generates. For example, the angle of rotation α in a pickup coil arrangement with an even number of single pickup coils (e.g. FIG. 11A) is determined as:

$$\alpha=360°/k/M/2.$$

In a pickup coil arrangement with an uneven number of single pickup coils (e.g. FIG. 12), the angle of rotation α is calculated as:

$$\alpha=360°/k/M.$$

In the above formulae, M indicates the number of single pickup coils present per pickup coil arrangement.

In the case of three single pickup coils 801, 802, 803, they can also be referred to as U coil, V coil and W coil. As can be seen here, the single pickup coils 801, 802, 803 have simply routed turns. That is to say, in contrast to an astatic single pickup coil, the non-astatic single pickup coils 801, 802, 803 shown here have no alternating turns with opposite winding direction. The non-astatic single pickup coils 801, 802, 803 are therefore not per se robust in the face of stray fields.

However, the single pickup coils 801, 802, 803 can be connected to an evaluation circuit for signal processing. The evaluation circuit can calculate the differences between coil pairs, for example U–V, V–W, W–U, in order to compensate for homogeneous stray fields that affect all the single pickup coils 801, 802, 803.

Since the non-astatic single pickup coils 801, 802, 803 have no turns wound in opposite senses, each of the single pickup coils 801, 802, 803 delivers a respective individual signal, i.e. a total of three signals are generated by the three single pickup coils 801, 802, 803, wherein these signals are phase-offset with respect to one another.

When the rotor rotates at constant velocity of rotation, an RF signal, of which the envelope varies virtually sinusoidally with the angle of rotation, is then generated in each of the three single pickup coils 801, 802, 803, wherein the signals have a phase offset of 360°/6=60° among one another in the example described here. When the rotor rotates through 360° (mechanical angle domain), the envelopes, i.e. the demodulated LF signals, have k periods. That is to say, if the arctangent is calculated from the ratio of the signals, the result varies by k*360°, which in this case (k=6) leads to ambiguities when determining the rotational position of the rotor relative to the stator occurring every 60° in the electrical angle domain.

Figure 1A:
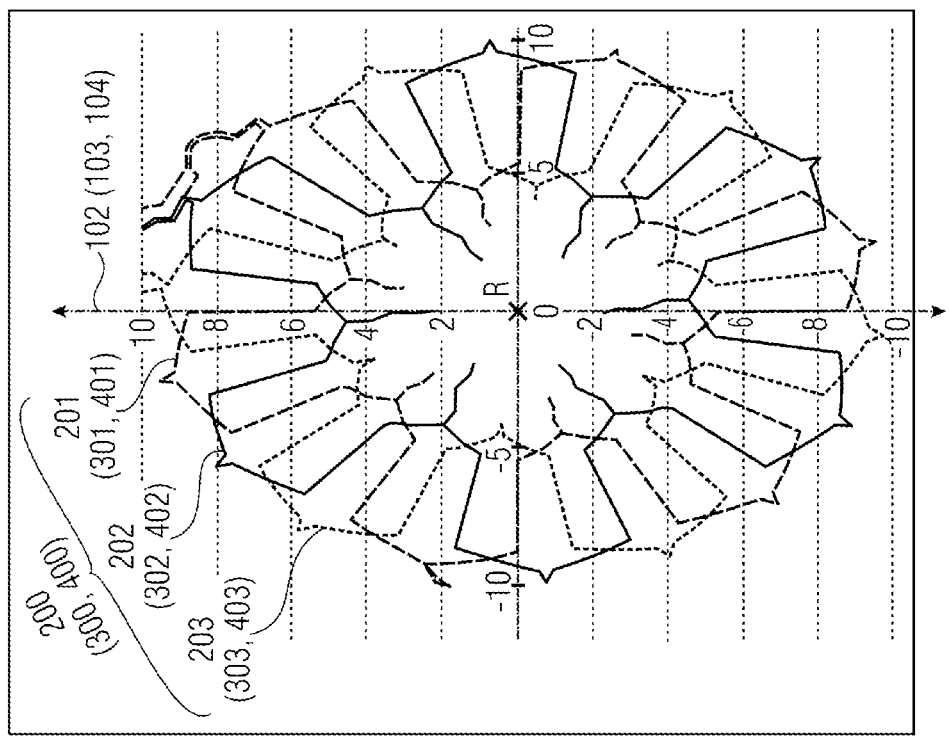
FIG. 1A shows a schematic plan view of an elliptically stretched inductive target and an elliptically stretched coil arrangement according to one exemplary embodiment.
Figure 1A:
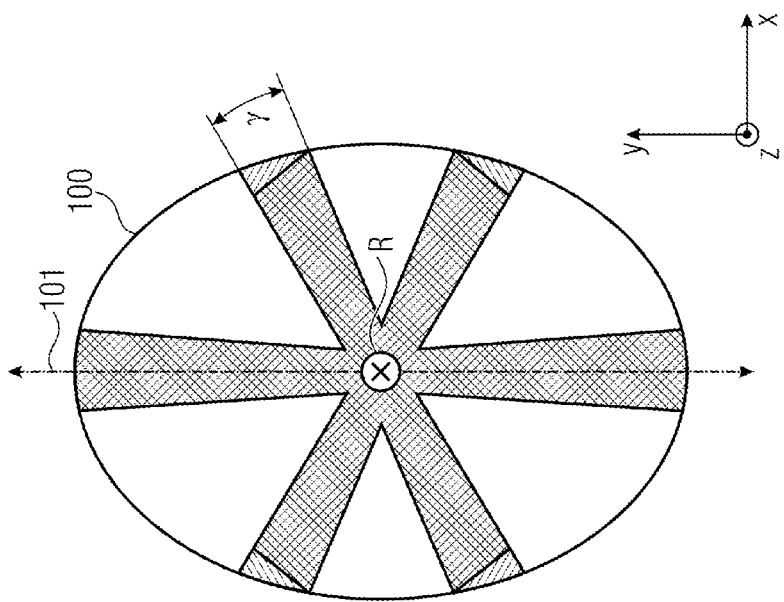

In order to avoid these ambiguities, an inductive angle sensor according to the innovative concept described herein is proposed. FIG. 1A shows a plan view of an inductive target 100 that can be used in such an inductive angle sensor. The target 100 can be arranged on a rotor component of the angle sensor. The rotor component or the inductive target 100 is arranged such that it is rotatable about an axis of rotation R (here: z-axis).

In this non-limiting example, the inductive target 100 has a 6-fold symmetry (k=6), wherein six rotor blades each having an opening angle of γ=30° are arranged symmetrically around the center of the rotor or around the axis of rotation R. As can be clearly seen here, the inductive target 100 is stretched along a first stretching axis 101 that runs perpendicularly to the axis of rotation R, so that the contour outline, as seen in plan view, of the inductive target 100 has an elliptical shape. In the example depicted here, the inductive target 100 is stretched along the y-axis.

In FIG. 1A, the stretching of the inductive target 100 is illustrated in an exaggerated manner for reasons of clarity. According to the innovative concept described herein, the stretching factor can be approximately $\psi_{Target} \geq 1.10$. That is to say, the elliptical shape of the stretched target 100 deviates along the stretching axis 101 by at least 10% in relation to a circular shape.

For reasons of completeness, reference should be made to FIGS. 1B to 1E at this point. For example, it can be seen in FIG. 1B that the target 100, illustrated purely by way of example and schematically here, has a substantially circular shape. However, it would also be possible for the outer and/or inner border of the target 100 to be a polygonal chain with k-fold symmetry. Furthermore, the straight stretches of the polygonal chain could also have a bent shape, provided that the entire shape has the k-fold symmetry. The target 100 has, in general, an outer periphery 121 and an inner periphery 122. The four, substantially identical, rotor blades $123_1$, ..., $123_4$ depicted here extend between the inner periphery 122 and the outer periphery 121. Where this description discusses stretching along a stretching axis, this can be understood to mean that the inner periphery 122 and/or the outer periphery 121 are/is stretched along this stretching axis.

Figure 1B:
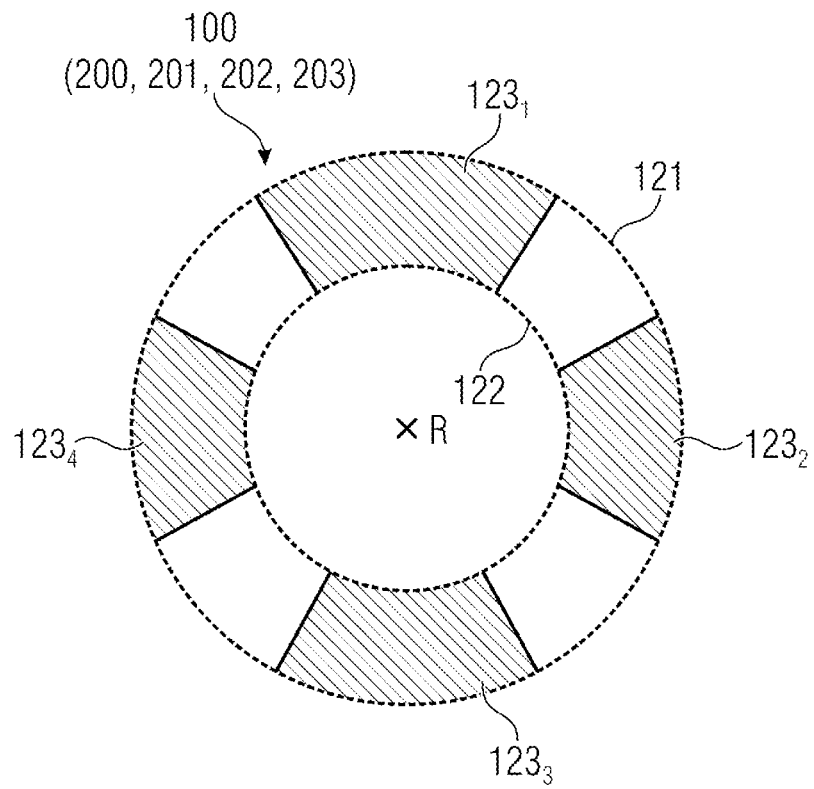
FIGS. 1B-1E show a schematic plan view of an elliptically stretched inductive target or an elliptically stretched single pickup coil according to one exemplary embodiment.
Figure 1C:
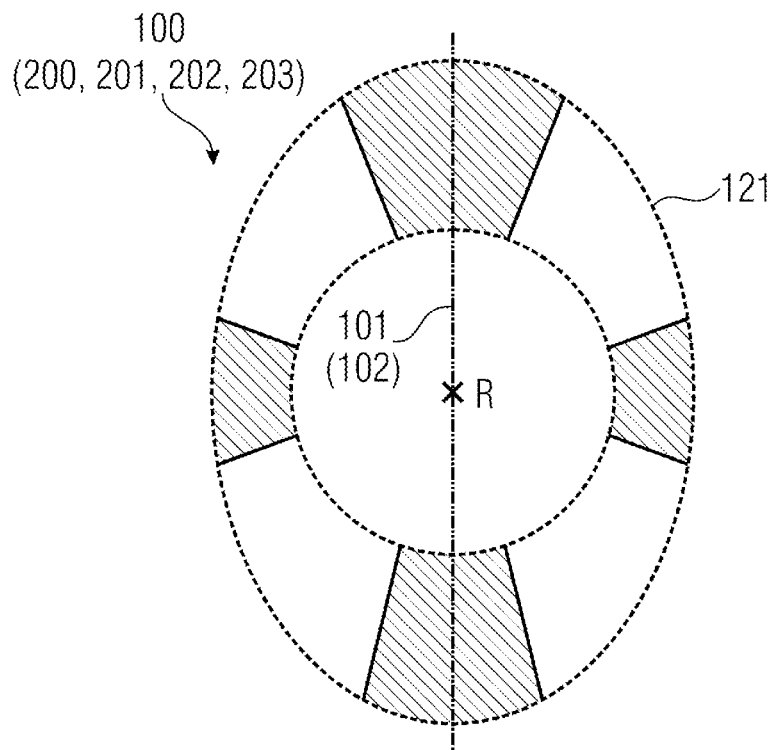
Figure 1D:
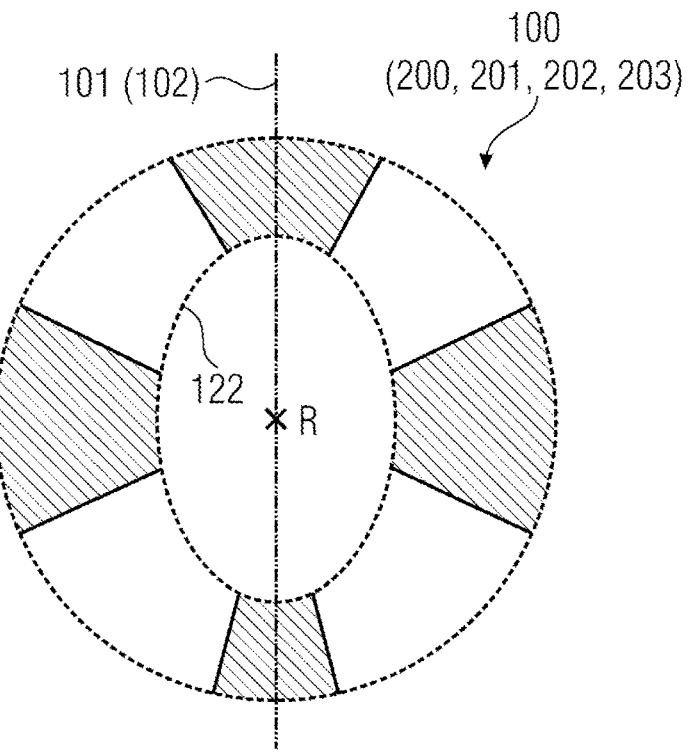
Figure 1E:
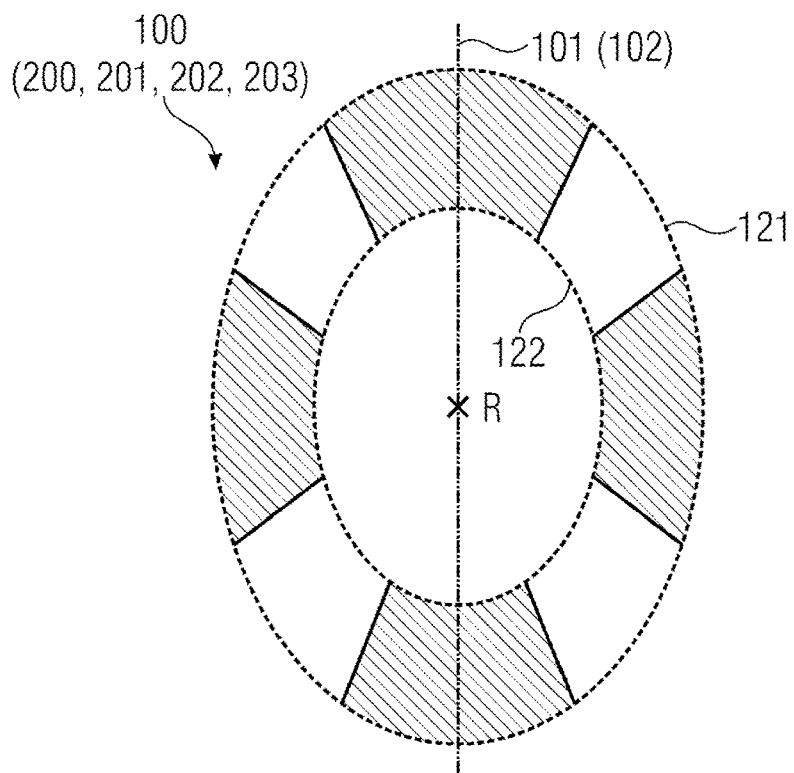

For example, in FIG. 1C, only the outer periphery 121 would be stretched along the drawn stretching axis 101. The inner periphery 122 can remain unstretched. However, in the example depicted in FIG. 1D, only the inner periphery 122 is stretched along the stretching axis 101, while the outer periphery 121 can remain unstretched. In FIG. 1E, both the inner periphery 122 and also the outer periphery are stretched along the stretching axis 101. In all cases, the stretching of the inner and/or outer periphery 121, 122 leads to the contour outline of the target 100 having a substantially elliptical shape.

Therefore, where this description refers to the target 100 being stretched along a stretching axis 101, so that the contour outline, as seen in plan view, of the target 100 has an elliptical shape, this can be understood to mean that either at least the outer periphery 121 or at least the inner periphery 122, or alternatively both the outer and also the inner periphery 121, 122, of the target 100 are/is stretched along this stretching axis 101.

An even more precise definition can be provided using the envelopes of the respective tooth or rotor blade $123_1$, ..., $123_4$. Specifically, very similar geometries can also be achieved by slight deviations from the exact stretching, this likewise being covered herein. For example, a tooth or a rotor blade $123_1$, ..., $123_4$ of the target 100 can have an elliptical periphery due to exact stretching. However, the periphery of this tooth $123_1$, ..., $123_4$ can also be straight. That is to say, the target 100 could have a polygon as envelope before the stretching—then the teeth $123_1$, ..., $123_4$ would in turn have straight outer edges along the periphery after the stretching. It is only important for the center points of these tooth flanks to lie on an ellipse. Furthermore, the tooth flanks could also be circular after the stretching, specifically if they had been placed on arcs of an ellipse, but with their centers of gravity on a circle, before the stretching.

Therefore, where this description refers to the target 100 being stretched along a stretching axis 101, so that the contour outline, as seen in plan view, of the target 100 has an elliptical shape, this can then be understood to mean that the target 100 had a k-fold symmetry before the stretching (not necessarily a circular envelope) and at least one of the inner and outer envelopes is stretched. The stretching of the target 100 along a stretching axis, so that an elliptical envelope is produced, has the advantage that no unbalance occurs, this possibly being advantageous particularly at high rotational speeds.

It should further be noted that the target 100 that is stretched along the stretching axis 101 can be generated from a target with virtually perfect k-fold symmetry (e.g. circular). This is also referred to as strict k-fold symmetry herein. After the stretching of the target with strict k-fold symmetry, the contour outline, as seen in plan view, of the target 100 can have an elliptical shape. This is also referred to as weak k-fold symmetry herein. Therefore, weak k-fold symmetry accordingly means, for example, that, given a rotation through 360°/k, the shape, apart from a stretching factor, merges into itself in the radial direction. That is to say, the shape merges into a similar shape (here, "similar shapes" are understood to mean mathematical terms, such as similar triangles). This means that the angles, as seen from the center of rotation, remain the same, but the radial distances are scaled by a factor.

Similarly to the example discussed above with reference to FIG. 11A, the inductive angle sensor also has a stator component (not explicitly illustrated here). In FIG. 1A, a pickup coil arrangement 200, which can be arranged on the stator component, is schematically shown on the left-hand side. The pickup coil arrangement 200 or the stator component is likewise arranged around the common axis of rotation R. The pickup coil arrangement 200 or the stator has at least one first single pickup coil 201 with k-fold symmetry, wherein the first single pickup coil 201 is rotated around the axis of rotation R through the abovementioned angle of rotation a in relation to the second single pickup coil 202.

According to the innovative concept described herein, at least the first single pickup coil 201 is stretched along a second stretching axis 102 that runs perpendicularly to the axis of rotation R, so that the contour outline, as seen in plan view, of the first single pickup coil 201 has an elliptical shape. In the non-limiting example shown here, the second single pickup coil 202 can also be stretched along the second stretching axis 102 that runs perpendicularly to the axis of rotation R, so that the contour outline, as seen in plan view, of the second single pickup coil 202 likewise has an elliptical shape. In the non-limiting example shown here, the third single pickup coil 203 can also be stretched along the second stretching axis 102 that runs perpendicularly to the axis of rotation R, so that the contour outline, as seen in plan view, of the third single pickup coil 203 likewise has an elliptical shape. Therefore, in the exemplary embodiment shown in FIG. 1A (left-hand side), the entire pickup coil arrangement 200 is stretched along the second stretching axis 102 that runs perpendicularly to the axis of rotation R, so that all the single pickup coils 201, 202, 203 are also stretched along the second stretching axis 102 that runs perpendicularly to the axis of rotation R.

However, it may already be sufficient for the innovative concept described herein when only an individual one of the single pickup coils 201, 202, 203 of the pickup coil arrangement 200 is stretched along the second stretching axis 102 that runs perpendicularly to the axis of rotation R, so that the contour outline, as seen in plan view, of the respective stretched single pickup coil 201, 202, 203 has an elliptical shape. The other single pickup coils can be non-stretched and their contour outlines therefore have a circular shape.

In FIG. 1A, the stretching of the single pickup coils 201, 202, 203 is likewise illustrated in an exaggerated manner for reasons of clarity. According to the innovative concept described herein, the stretching factor can be approximately $\psi_{Coil} \geq 1.10$. That is to say, the elliptical shape of the stretched single pickup coil 201, 202, 203 deviates along its stretching axis 102 by at least 10% in relation to a circular shape.

For reasons of completeness, reference should be made to FIGS. 1B to 1E at this point. The statements made above using the example of an inductive target 100 can, as it were, also apply to a pickup coil arrangement 200 and also to a single pickup coil 201, 202, 203. For example, a pickup coil arrangement 200 or a single pickup coil 201, 202, 203 can have a substantially circular shape (FIG. 1B). However, it would also be conceivable for the outer and/or inner border of the pickup coil arrangement 200 or the single pickup coil 201, 202, 203 to be a polygonal chain with k-fold symmetry. Furthermore, the straight stretches of the polygonal chain could also have a bent shape, provided that the entire shape has the k-fold symmetry. The pickup coil arrangement 200 or the single pickup coil 201, 202, 203 has, in general, an outer periphery 121 and an inner periphery 122. The four, substantially identical, turns $123_1, \ldots, 123_4$ depicted here extend between the inner periphery 122 and the outer periphery 121. Where this description discusses stretching along a stretching axis, this can be understood to mean that the inner periphery 122 and/or the outer periphery 121 is stretched along this stretching axis.

For example, in FIG. 1C, only the outer periphery 121 would be stretched along the drawn stretching axis 102. The inner periphery 122 can remain unstretched. In contrast, in the example depicted in FIG. 1D, only the inner periphery 122 is stretched along the stretching axis 102, while the outer periphery 121 can remain unstretched. In FIG. 1E, both the inner periphery 122 and also the outer periphery are stretched along the stretching axis 102. In all cases, the stretching of the inner and/or outer periphery 121, 122 leads to the contour outline of the pickup coil arrangement 200 or the single pickup coil 201, 202, 203 having a substantially elliptical shape.

Therefore, where this description refers to the pickup coil arrangement 200 or the single pickup coil 201, 202, 203 being stretched along a stretching axis 102, so that the contour outline, as seen in plan view, of the pickup coil arrangement 200 or the single pickup coil 201, 202, 203 has an elliptical shape, this can be understood to mean that either at least the outer periphery 121 or at least the inner periphery 122, or alternatively both the outer and also the inner periphery 121, 122 of the pickup coil arrangement 200 or the single pickup coil 201, 202, 203 are/is stretched along this stretching axis 102.

An even more precise definition can be provided using the envelopes of the respective turn $123_1, \ldots, 123_4$. Specifically, very similar geometries can also be achieved by slight deviations from the exact stretching, this likewise being covered herein. For example, a turn $123_1, \ldots, 123_4$ of the pickup coil arrangement 200 or the single pickup coil 201, 202, 203 can have an elliptical periphery due to exact stretching. However, the periphery of this turn $123_1, \ldots, 123_4$ can also be straight. That is to say, the pickup coil arrangement 200 or the single pickup coil 201, 202, 203 could have a polygon as envelope before the stretching—then the turns $123_1, \ldots, 123_4$ would in turn have straight outer edges along the periphery after the stretching. It is only important for the center points of the outer flanks of the turns to lie on an ellipse. Furthermore, the outer flanks of the turns could also be circular after the stretching, specifically if they had been placed on arcs of an ellipse, but with their centers of gravity on a circle, before the stretching.

Therefore, where this description refers to the pickup coil arrangement 200 or the single pickup coil 201, 202, 203 being stretched along a stretching axis 102, so that the contour outline, as seen in plan view, of the pickup coil arrangement 200 or the single pickup coil 201, 202, 203 has an elliptical shape, this can then be understood to mean that the pickup coil arrangement 200 or the single pickup coil 201, 202, 203 had a k-fold symmetry before the stretching (not necessarily a circular envelope) and at least one of the inner and outer envelopes is stretched.

It should further be noted that the pickup coil arrangement 200 or the single pickup coil 201, 202, 203 that is stretched along the stretching axis 102 can be generated from a pickup coil arrangement or a single pickup coil with virtually perfect k-fold symmetry (e.g. circular). This is also referred to as strict k-fold symmetry herein. After the stretching of the pickup coil arrangement 200 or the single pickup coil 201, 202, 203 with strict k-fold symmetry, the contour outline, as seen in plan view, of the pickup coil arrangement 200 or the single pickup coil 201, 202, 203 can have an elliptical shape. This is also referred to as weak k-fold symmetry herein. Therefore, weak k-fold symmetry accordingly means, for example, that, given a rotation through 360°/k, the shape, apart from a stretching factor, merges into itself in the radial direction. That is to say, the shape merges into a similar shape (here, "similar shapes" are understood to mean mathematical terms, such as similar triangles). This means that the angles, as seen from the center of rotation, remain the same, but the radial distances are scaled by a factor.

In addition, it should also be mentioned here that FIG. 1 is merely a schematic illustration. The axis of rotation R is, of course, the same both in the pickup coil arrangement 200, shown on the left-hand side in the figure, and in the inductive target 100, shown on the right-hand side in the figure, i.e. the pickup coil arrangement 200 and the inductive target 100 are arranged one above the other along the common axis of rotation R. An air gap is located between the pickup coil arrangement 200 and the inductive target 100.

The inductive angle sensor or the stator component can have a second pickup coil arrangement (not explicitly illustrated here for reasons of clarity). The second pickup coil arrangement can be substantially identical to the pickup coil arrangement 200 depicted here and have the same number of single pickup coils. For the sake of better distinguishability, the second pickup coil arrangement is provided with the reference sign 300 and the respective single pickup coils of said second pickup coil arrangement are provided with the reference signs 301, 302, 303 below.

The two pickup coil arrangements 200, 300 can be rotated around the common axis of rotation R in relation to one another. In this case, at least one, and in some exemplary embodiments precisely one, of the two pickup coil arrangements 200, 300 can be, as just described, stretched along the second stretching axis 102 and have an elliptical shape. The respectively other pickup coil arrangement 200, 300 can be non-stretched and have a circular shape.

According to an exemplary embodiment of this kind, the stator component can therefore have a first pickup coil arrangement 200 with at least two single pickup coils 201, 202 and have a second pickup coil arrangement 300 that is rotated around the axis of rotation R with respect to said first pickup coil arrangement and likewise has at least two single pickup coils 301, 302. Here, the first and the second single pickup coil 201, 202 can belong to the first pickup coil arrangement 200, wherein the entire first pickup coil arrangement 200 is stretched along the second axis 102, so that the contour outline, as seen in plan view, of the entire first pickup coil arrangement 200 has an elliptical shape. As mentioned at the outset, the second pickup coil arrangement 300 can be non-stretched, so that the contour outline, as seen in plan view, of the second pickup coil arrangement 300 has a circular shape. That is to say, in such an exemplary embodiment, the stator component would have an elliptical pickup coil arrangement 200 with at least two single pickup coils 201, 202 and a non-stretched circular pickup coil arrangement 300 with likewise at least two single pickup coils 301, 302.

As an alternative to this, a further conceivable exemplary embodiment can provide that both the first pickup coil arrangement 200 and also the second pickup coil arrangement 300 are stretched and have an elliptical shape. Since the two pickup coil arrangements 200, 300 are also always rotated in relation to one another, and the first pickup coil arrangement 200 is stretched along the second stretching axis 102, the second pickup coil arrangement 300 can therefore be stretched along a third axis 103 that runs perpendicularly to the axis of rotation R.

That is to say, in such an exemplary embodiment, the stator component could have a first elliptical pickup coil arrangement 200 with at least two single pickup coils 201, 202 and have a second elliptical pickup coil arrangement 300 that is rotated around the axis of rotation R with respect to said first pickup coil arrangement and likewise has at least two single pickup coils 301, 302. Here, the entire first pickup coil arrangement 200 could be stretched along the second axis 102, so that the contour outline, as seen in plan view, of the entire first pickup coil arrangement 200 has an elliptical shape, and the entire second pickup coil arrangement 300 could be stretched along a third axis 103 that runs perpendicularly to the axis of rotation R, so that the contour outline, as seen in plan view, of the entire second pickup coil arrangement 300 has an elliptical shape.

In principle, the second and the third axis 102, 103 could run in different directions, so that the first pickup coil arrangement 200 and the second pickup coil arrangement 300 are each stretched in different directions. In general, this applies not only to the pickup coil arrangements 200, 300, but generally also to the first single pickup coil 201 and the second single pickup coil 202, irrespective of whether the two single pickup coils 201, 202 belong to the same pickup coil arrangement 200 or to two different pickup coil arrangements 200, 300. That is to say, the first single pickup coil 201 could be stretched along the second stretching axis 102, and the second single pickup coil 202 could be stretched along the third stretching axis 103, specifically independently of whether the two single pickup coils 201, 202 belong to the same pickup coil arrangement 200 or to two different pickup coil arrangements 200, 300.

Accordingly, a further conceivable exemplary embodiment could therefore also provide that an individual pickup coil arrangement 200 has two single pickup coils 201, 202 that are stretched in different directions. That is to say, for example, the stator component could have at least one, and in some exemplary embodiments precisely one, pickup coil arrangement 200 with at least two single pickup coils 201, 202, wherein the first single pickup coil 201 is stretched along the second axis 102, so that the contour outline, as seen in plan view, of the first single pickup coil 201 has an elliptical shape, and wherein additionally the second single pickup coil 202 is stretched along a third axis 103 that runs perpendicularly to the axis of rotation R, so that the contour outline, as seen in plan view, of the second single pickup coil 202 likewise has an elliptical shape. Since the two stretching axes 102, 103, as already mentioned above, can run in different directions, the two single pickup coils 201, 202 of the same pickup coil arrangement 200 can therefore accordingly also be stretched in different directions.

For all the exemplary embodiments described herein, it would be conceivable for the second and the third stretching axis 102, 103 to be arranged at an angle ε of more than 360°/k with respect to one another. According to an advantageous exemplary embodiment, the second and the third axis 102, 103 could be arranged at an angle of $20° \leq \varepsilon \leq 90°$, or at an angle of $\varepsilon = 60°$, with respect to one another.

The schematic view in FIG. 1, depicted on the left-hand side, of a pickup coil arrangement 200 has a total of not only two but rather three single pickup coils 201, 202, 203. In the non-limiting exemplary embodiment shown in FIG. 1, all three single pickup coils 201, 202, 203 are stretched in the same direction, i.e. along the second stretching axis 102. However, as an alternative, it would also be entirely conceivable here for all three single pickup coils 201, 202, 203 to each be stretched in different directions.

That is to say, in such an exemplary embodiment, the stator component could therefore accordingly have, for example, an individual pickup coil arrangement 200 with at least three elliptical pickup coils 201, 202, 203 that are stretched in different directions. Here, the first single pickup coil 201 could be stretched along the second axis 102, so that the contour outline, as seen in plan view, of the first single pickup coil 201 has an elliptical shape stretched in a first direction. At the same time, the second single pickup coil 202 could additionally be stretched along a third axis 103 that runs perpendicularly to the axis of rotation R, so that the contour outline, as seen in plan view, of the second single pickup coil 202 has an elliptical shape stretched in a second direction. At the same time, the third single pickup coil 203 could also additionally further be stretched along a fourth axis 104 that runs perpendicularly to the axis of rotation R, so that the contour outline, as seen in plan view, of the third single pickup coil 203 has an elliptical shape stretched in a third direction.

Here, the second axis 102, the third axis 103 and the fourth axis 104 can each run in different directions, so that the first single pickup coil 201, the second single pickup coil 202 and the third single pickup coil 203 are each stretched in different directions from one another.

For example, the third axis 103 can be arranged at an angle $\varepsilon_{32}$ of more than 360°/k relative to the second axis 102, so that the first single pickup coil 201 and the second single pickup coil 202 are each stretched in different directions and in the process are each rotated through the angle $\varepsilon_{32}$ in relation to one another. In addition, the third axis 103 can be arranged at an angle $\varepsilon_{43}$ of more than 360°/k relative to the fourth axis 104, so that the second single pickup coil 202 and the third single pickup coil 203 are each stretched in different directions and in the process are each rotated through the angle $\varepsilon_{43}$ in relation to one another.

According to one conceivable exemplary embodiment, the third axis 103 can be arranged at an angle of 20°≤ε≤90°, or at an angle of ε=60°, relative to the second axis 102 and/or relative to the fourth axis 104.

In a further conceivable exemplary embodiment (not explicitly illustrated here for reasons of clarity), the stator component can also further have, in addition to the two pickup coil arrangements 200, 300 discussed herein, a third pickup coil arrangement with in each case at least two single pickup coils. This third pickup coil arrangement can be substantially identical to the pickup coil arrangement 200 depicted here and have the same number of single pickup coils. For the sake of better distinguishability, the third pickup coil arrangement is provided with the reference sign 400, and the respective single pickup coils of said third pickup coil arrangement are provided with the reference signs 401, 402, 403 below.

According to a conceivable exemplary embodiment, all three pickup coil arrangements 200, 300, 400 can be stretched in different directions. That is to say, the stator component can have, for example, a first pickup coil arrangement 200 with in each case at least two single pickup coils 201, 202, a second pickup coil arrangement 300 with in each case at least two single pickup coils 301, 302, and a third pickup coil arrangement 400 with in each case at least two single pickup coils 401, 402, wherein all three pickup coil arrangements 200, 300, 400 are rotated around the axis of rotation R in relation to one another.

At least one single pickup coil 201 of the first pickup coil arrangement 200 can be stretched along the second stretching axis 102, so that the contour outline, as seen in plan view, of the at least one single pickup coil 201 of the first pickup coil arrangement 200 has an elliptical shape. As an alternative to this, the entire first pickup coil arrangement 200 can be stretched along the second stretching axis 102, so that the entire contour outline, as seen in plan view, of the entire first pickup coil arrangement 200 has an elliptical shape.

At least one single pickup coil 301 of the second pickup coil arrangement 300 can be stretched along the third stretching axis 103, so that the contour outline, as seen in plan view, of the at least one single pickup coil 301 of the second pickup coil arrangement 300 has an elliptical shape. As an alternative to this, the entire second pickup coil arrangement 300 can be stretched along the third stretching axis 103, so that the contour outline, as seen in plan view, of the entire second pickup coil arrangement 300 has an elliptical shape.

At least one single pickup coil 401 of the third pickup coil arrangement 400 can be stretched along the fourth stretching axis 104, so that the contour outline, as seen in plan view, of the at least one single pickup coil 401 of the third pickup coil arrangement 400 has an elliptical shape. As an alternative to this, the entire third pickup coil arrangement 400 can be stretched along the fourth stretching axis 104, so that the contour outline, as seen in plan view, of the entire first pickup coil arrangement 400 has an elliptical shape.

It is conceivable here for the second axis 102, the third axis 103 and the fourth axis 104 to each run in different directions, so that the first pickup coil arrangement 200, the second pickup coil arrangement 300 and the third pickup coil arrangement 400 are each stretched in different directions from one another.

In addition, it is conceivable for the third axis 103 to be arranged at an angle $\varepsilon_{32}$ of more than 360°/k relative to the second axis 102, so that the first pickup coil arrangement 200 and the second pickup coil arrangement 300 are each stretched in different directions and in the process are each rotated through the angle $\varepsilon_{32}$ in relation to one another. In addition, the third axis 103 can be arranged at an angle $\varepsilon_{43}$ of more than 360°/k relative to the fourth axis 104, so that the second pickup coil arrangement 300 and the third pickup coil arrangement 400 are each stretched in different directions and in the process are each rotated through the angle $\varepsilon_{43}$ in relation to one another.

According to one preferred exemplary embodiment, the third axis 103 can be arranged at an angle of 20°≤ε≤90°, or at an angle of ε=60°, relative to the second axis 102 and/or relative to the fourth axis 104.

In all the embodiments described herein, the stretching factor $\psi_{Coil}$ in the respectively elliptically stretched pickup coil arrangements 200, 300, 400 or in the respectively elliptically stretched single pickup coils can be the same, so that all the stretched pickup coil arrangements 200, 300, 400 or single pickup coils are stretched to the same extent. That is to say, the stretching factor $\psi_{Coil}$ of the respective pickup coil arrangement 200, 300, 400 or single pickup coil that is stretched along the second stretching axis 102 and/or third stretching axis 103 and/or fourth stretching axis 104 can be identical. The stretching factor can be $\psi_{Coil} \geq 1.10$, so that the elliptical shape of the respectively elliptically stretched pickup coil arrangement 200, 300, 400 or single pickup coil is stretched along the respective stretching axis 102, 103, 104 by at least 10% in relation to a circular shape.

This can also apply to the inductive target 100. That is to say, the inductive target 100 can have a stretching factor of $\psi_{Target} \geq 1.10$, so that the elliptical shape of the inductive target 100 is stretched along the first stretching axis 101 by at least 10% in relation to a circular shape. As an alternative or in addition, the stretching factor $\psi_{Target}$ of the inductive target 100 can be identical to the stretching factor $\psi_{Coil}$ of the respective pickup coil arrangement 200, 300, 400 or single pickup coil that is stretched along the second stretching axis 102 and/or the third stretching axis 103 and/or the fourth stretching axis 104.

For the sake of completeness, it should be mentioned at this point that the stretching factor $\psi_{Target}$ or $\psi_{Coil}$ should be so large that tolerances in respect of eccentricities of target 100 and single pickup coils and also any possible wobbling and bearing play of the rotor are considerably smaller. If these tolerances make up e.g. 0.5 mm in total, $(\psi-1)*$Radius (of the inside or outside diameter to be stretched) of the target 100 (and also of the single pickup coil) should be at least 1.5 mm. Therefore, when the outer border of the target 100 is stretched and had a radius of 15 mm before stretching, the stretching factor $\psi_{Target}$ should therefore be at least 1.1. On the other hand, attempts are made to not make the stretching factor $\psi_{Target}$ unnecessarily large since the space requirement of the system would be large as a result and the signal quality would also be negatively influenced, e.g. it is disadvantageous when the magnitude of the signal fluctuates to an extreme extent during rotation; 10 to 20% fluctuation is acceptable, but fluctuations of more than 100% are hardly reasonable.

The exemplary embodiments described herein with an elliptically stretched target 100 and/or elliptically stretched pickup coil arrangements 200, 300, 400 or single pickup coils allow the inductive target 100 to be configured as a solid shaped metal part (e.g. punched part) that withstands high rotational speeds and in the process at the same time allow an inductive angle sensor to be provided, which inductive angle sensor can dispel the previous ambiguities in determining the rotation position of the rotor relative to the stator. For this purpose, the inductive angle sensor according to the innovative concept described herein has an evaluation circuit that is configured in order to evaluate signals of the elliptically stretched pickup coil arrangements 200, 300, 400 or single pickup coils and to considerably reduce or to entirely suppress ambiguities in determining the rotation position.

Depending on the embodiment of the inductive angle sensor, the manner of determining the rotation position of the rotor relative to the stator can differ. Therefore, different exemplary embodiments for evaluation circuits for the different embodiments of the inductive angle sensor are described below.

According to a first example, the inductive angle sensor may be an inductive angle sensor that has an elliptically stretched inductive target 100 and also two elliptically stretched pickup coil arrangements 200, 300 each with at least two single pickup coils. Pickup coil arrangements that each have at least three single pickup coils are used as a basis for the following explanation. However, the concept described herein is generally also suitable for pickup coil arrangements that have only two single pickup coils.

The first pickup coil arrangement 200 can be stretched along the stretching axis 102 in a first direction. The second pickup coil arrangement 300 can be stretched along the stretching axis 103 in a different, second direction.

The two stretching axes 102, 103 can be arranged at an angle of $20°≤\epsilon≤90°$, or at an angle of $\epsilon=60°$, with respect to one another. For example, the first pickup coil arrangement 200 can be stretched in the x-direction (0°), and the second pickup coil arrangement 300 can be stretched in the y-direction (90°). Accordingly, the first single pickup coil 201 of the first pickup coil arrangement 200 would be offset through the angle $\epsilon$ (e.g. $\epsilon=90°$) relative to the first single pickup coil 301 of the second pickup coil arrangement 300, the second single pickup coil 202 of the first pickup coil arrangement 200 would likewise be offset through the angle $\epsilon$ (e.g. $\epsilon=90°$) relative to the second single pickup coil 302 of the second pickup coil arrangement 300, and the third single pickup coil 203 of the first pickup coil arrangement 200 would for its part be offset through the angle $\epsilon$ (e.g. $\epsilon=90°$) relative to the third single pickup coil 303 of the second pickup coil arrangement 300.

Figure 2:
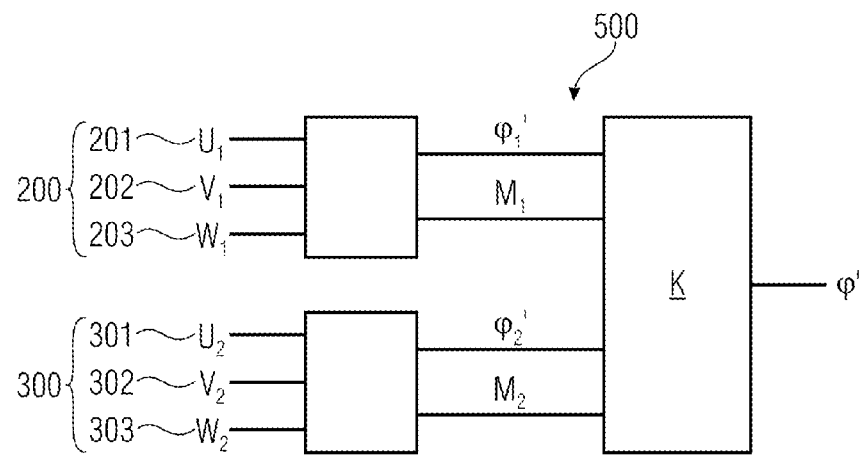
FIG. 2 shows a schematic block diagram of an evaluation circuit according to one exemplary embodiment.

FIG. 2 shows a schematic view of an evaluation circuit 500. As can be seen, the evaluation circuit 500 can be connected to a first elliptically stretched pickup coil arrangement 200 with in each case three single pickup coils 201, 202, 203 and also to a second elliptically stretched pickup coil arrangement 300 with likewise in each case three single pickup coils 301, 302, 303. As has already been mentioned at the outset, each single pickup coil generates a signal in the electrical angle domain.

The signal generated by a single pickup coil is a signal that depends on the angular position. However, a conclusion about the angular position of the rotor relative to the stator cannot be drawn from this one signal. For this purpose, all the signals of all the single pickup coils of a complete pickup coil arrangement (U, V, W or SIN, COS) are required in order to derive using this an angular position of the rotor relative to the stator, this occasionally also being referred to as the rotor position herein. The signals of the single pickup coils are, in particular, amplitude-modulated RF signals, i.e. they have a certain carrier frequency, but the amplitude thereof varies with the position of the rotor relative to the stator.

These amplitude-modulated RF signals can be demodulated. After the demodulation of the respective amplitude-modulated RF signals, for example by means of a phase-coherent demodulator, the respective envelope of these RF signals is obtained (also see FIG. 11B). That is to say, the radio-frequency, amplitude-modulated RF signals are obtained before the demodulation, and low-frequency LF signals are obtained after the demodulation.

The respective envelopes, i.e. the demodulated LF signals, can be placed in a relationship with the position of the rotor in relation to the stator, so that the rotor position can be determined on the basis of the demodulated LF signals. This can be achieved by calculating the arctangent of the two LF signals that are phase-shifted with respect to one another (see FIG. 11C).

The rotor position can be indicated by means of an angle signal. Where this description refers to angle signals, this means the demodulated LF signals just mentioned. Herein, an angle signal is also referred to as rotation angle signal, or simply only rotation angle $\varphi$ (mechanical angle domain) or $\varphi'$ (electrical angle domain). The LF angle signal has a phase and a signal amplitude. Where this description refers to signal amplitudes, this means the signal amplitude after the demodulation of an amplitude-modulated RF signal of a single pickup coil, i.e. the signal amplitude of a demodulated LF signal.

The evaluation circuit 500 can be configured in order to ascertain, from the three single signals of the single pickup coils 201 (U1), 202 (V1), 203 (W1) of the first pickup coil arrangement 200, an electrical rotation angle $\varphi1'$ (also referred to as phi1'). The evaluation circuit 500 can further be configured in order to ascertain, from the three single signals of the single pickup coils 301 (U2), 302 (V2), 303 (W2) of the second pickup coil arrangement 300, an electrical rotation angle $\varphi2'$ (also referred to as phi2'). The electrical rotation angles $\varphi1'$, $\varphi2'$ have a periodicity of $\varphi=360°/k$. The mechanical rotation angle is denoted by $\varphi$ (or else by phi) herein. The electrical rotation angle is denoted by $\varphi'$ (or else by phi') herein.

The evaluation circuit 500 can be configured in order to ascertain the first electrical rotation angle φ1', for example in accordance with the following rule:

$$\varphi1' = \arctan 2(\sqrt{3}(V_1-W_1), 2U_1-V_1-W_1)$$

This calculation rule applies particularly when the three single pickup coils 301, 302, 303 are identical and are arranged rotated through 120°/k in relation to one another. In addition, this calculation rule applies particularly if all three single pickup coils 301, 302, 303 are stretched in the same direction by the same factor. If the single pickup coils 301, 302, 303 were stretched by different factors, the signals U1, V1, W1 could be scaled with suitable factors that can be ascertained, for example, experimentally or by calculation.

The evaluation circuit 500 can further be configured in order to ascertain the second electrical rotation angle φ2', for example in accordance with the following rule:

$$\varphi2' = \arctan 2(\sqrt{3}(V_2-W_2), 2U_2-V_2-W_2)$$

The evaluation circuit 500 can also be configured in order to ascertain, from the three single signals U1, V1, W1 of the single pickup coils 201, 202, 203 of the first pickup coil arrangement 200, an amplitude value M1. The evaluation circuit 500 can additionally be configured in order to ascertain, from the three single signals U2, V2, W2 of the single pickup coils 301, 302, 303 of the second pickup coil arrangement 300, an amplitude value M2. The amplitude values M1, M2 change depending on the rotation position of the rotor relative to the stator on account of the ellipticity of the target 100 and the single pickup coils 301, 302, 303. The amplitude values M1, M2 likewise vary in relation to the mechanical rotation angle with a periodicity of 180° (in the mechanical angle domain). The reason for the 180° period of the amplitude values is that a rotation of the target through 180° replicates their elliptical envelope on itself.

The evaluation circuit 500 can be configured, for example, in order to ascertain the first amplitude value M1 in accordance with the following rule:

$$M1 = \sqrt{((\sqrt{3}(V_1-W_1))^2 + (2U_1-V_1-W_1)^2}$$

The evaluation circuit 500 can be configured, for example, in order to ascertain the second amplitude value M2 in accordance with the following rule:

$$M2 = \sqrt{((\sqrt{3}(V_2-W_2))^2 + (2U_2-V_2-W_2)^2}$$

The two amplitude values M1, M2 would be constant over the entire angle range of 0° to 360° in a pickup coil arrangement without stretching (that is to say with circular envelopes). A mild variation depending on the angular position occurs only by stretching the target 100 and the pickup coil arrangement 200, 300.

Figure 3:
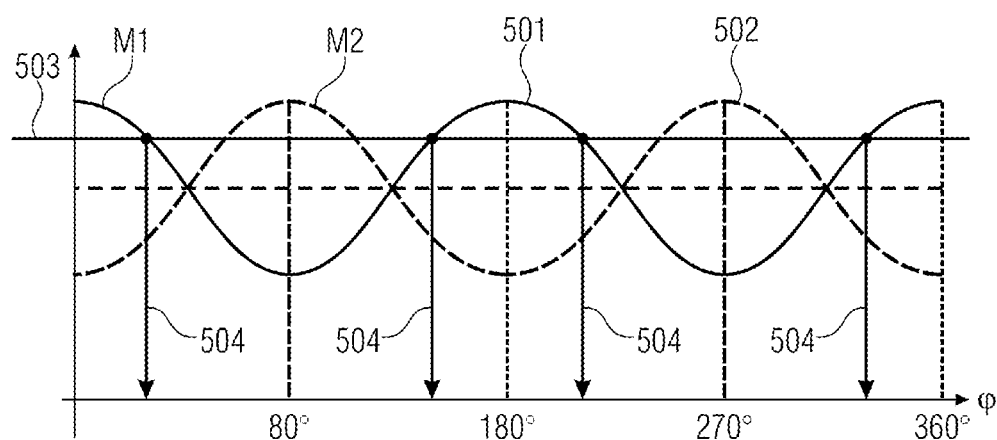
FIG. 3 shows an exemplary plot of two fluctuating signals of two elliptically stretched coils that are offset with respect to one another.

FIG. 3 shows a non-limiting example of two signals 501, 502 that originate from two pickup coil arrangements 200, 300, wherein the first pickup coil arrangement 200 is stretched along a first stretching axis 101, and wherein the second pickup coil arrangement 300 is stretched along a second stretching axis 102, and wherein the two stretching axes 101, 102 are arranged at an angle of ε=90° with respect to one another. The two signals 501, 502 have a phase offset of 90° and also signal amplitudes M1 and M2. The phase offset results from the rotation of the stretching axes 101, 102 of the two elliptically stretched pickup coil arrangements 200, 300 through 90° (mentioned purely by way of example here). The fluctuating signal amplitudes M1, M2 result from the elliptical stretching of the target 100 and also the respective pickup coil arrangements 200, 300. The signal amplitude M1 is at a maximum when the stretching direction of the target 100 corresponds to the stretching direction of the first pickup coil arrangement 200 (having the coils U1, V1, W1), and it is at a minimum when these two stretching directions are orthogonal to one another.

The signal amplitudes M1, M2 have a twofold periodicity within a complete mechanical revolution of 360°. The signal amplitude M1 is at a first minimum at a rotor position of (in this non-limiting example) 90° and also a second minimum at a rotor position of (in this non-limiting example) 270°. This is due to the rotor (in this non-limiting example) having a maximum overlap with the first pickup coil arrangement 200 in these angle positions. The signal amplitude M2 is at a first minimum at a rotor position of (in this non-limiting example) 0° or 360° and also a second minimum at a rotor position of (in this non-limiting example) 180°. This is due to the rotor (in this non-limiting example) having a maximum overlap with the second pickup coil arrangement 300 in these angle positions.

It can be seen in FIG. 3 that initially ambiguities can still occur at a specific rotor position (illustrated by the blue horizontal line 503). The signals 501, 502 have the same amplitude information or the same ratio M1/M2 of the two amplitudes in four positions (illustrated by the blue vertical arrows 504).

However, with the addition of the angle information, i.e. the abovementioned, ascertained electrical rotation angles φ1' and φ2', unambiguity in determining the rotation position of the rotor relative to the stator can now be attained. To this end, the evaluation circuit 500 can be configured in order to combine the signal amplitudes M1, M2 and at least one of the electrical rotation angles φ1' and φ2' with one another. For example, the evaluation circuit can have a combination unit K (FIG. 2) for this purpose.

Figure 4:
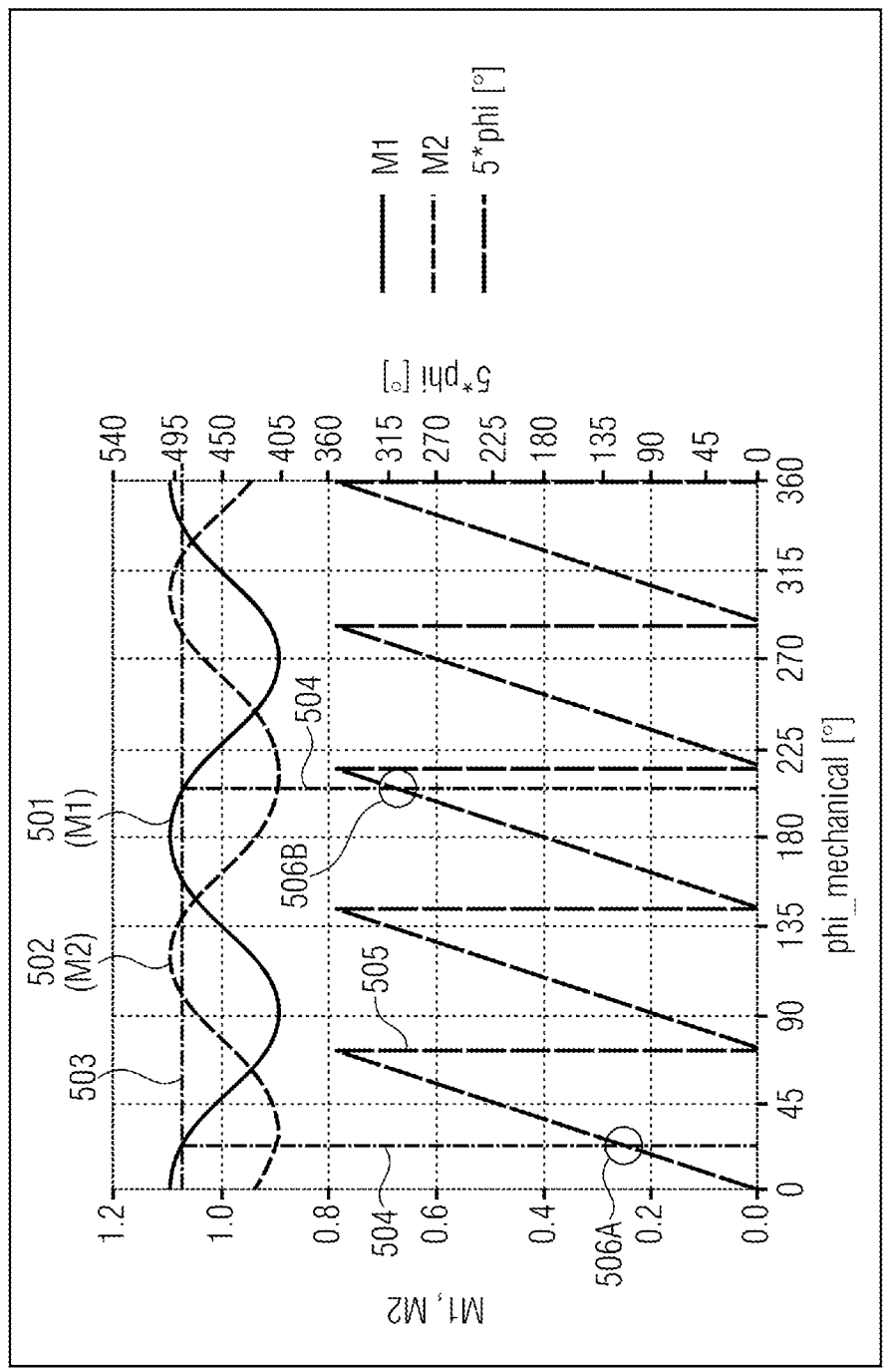
FIG. 4 shows an exemplary plot of two fluctuating signals and also of an electrical angle signal of two elliptically stretched coils that are offset through 60° with respect to one another and have an uneven-numbered k-fold symmetry.

FIG. 4 shows an exemplary plot for illustrating the result of the combination of signal amplitudes M1, M2 and rotation angles φ1', φ2' just mentioned. This plot originates from an inductive angle sensor according to the innovative concept described herein, having a rotor and a (still unstretched) target with 5-fold symmetry (k=5) and with two elliptically stretched pickup coil arrangements 200, 300, wherein the first pickup coil arrangement 200 is stretched along a first stretching axis 101, and wherein the second pickup coil arrangement 300 is stretched along a second stretching axis 102, wherein the two stretching axes 101, 102 are arranged at an angle of ε=60° with respect to one another.

If the rotor or the target 100 now rotates through a complete φ=360° in the mechanical angle domain, an electrical angle φ' with k-fold periodicity can be ascertained by means of an individual k-fold pickup coil arrangement 200, 300 in accordance with φ'=k*φ. Limited to an angle range of 360°:

$$\varphi' = \mathrm{mod}(k*\varphi, 360°)$$

Therefore, with the 5-fold symmetry (k=5) mentioned by way of example here, an electrical angle signal is obtained five times for a complete revolution of 360° in the mechanical angle domain. This is illustrated with reference to the sawtooth curve 505 in FIG. 4. The sawtooth curve 505 represents the angle signal in the electrical domain, that is to say the electrical angle φ'. The sawtooth curve 505 has five peaks on account of the 5-fold symmetry (k=5).

The two signals 501, 502 of the two pickup coil arrangements 200, 300 with their respective signal amplitudes M1, M2 are also again shown in FIG. 4. The two signals 501, 502 have a phase offset of 60° (in this non-limiting example). This results from the rotation of the stretching axes 102, 103 of the two elliptically stretched pickup coil arrangements 200, 300 through ε=60° (mentioned purely by way of example here).

The signal amplitudes M1, M2 have a two-fold periodicity within a complete mechanical revolution of 360°. The signal amplitude M1 is at a first minimum at a rotor position of 90° and at a second minimum at a rotor position of 270°. This is due to the rotor having a maximum overlap with the first pickup coil arrangement 200 in these angle positions. The signal amplitude M2 is at a first minimum at a rotor position of 30° and at a second minimum at a rotor position of 210°. This is due to the rotor having a maximum overlap with the second pickup coil arrangement 300 in these angle positions.

Purely by way of example, a specific rotor position with reference to the horizontal line 503 is also drawn in FIG. 4 again. It can be seen that this horizontal line 503 intersects the signal 501 of the first pickup coil arrangement 200 at four points, wherein, on account of the phase offset of 60°, the ratio between the two signal amplitudes M1/M2 is identical only at two points. These two points are marked by the vertical lines 504. However, at these points, the sawtooth curve 505 has a respectively different value, this in turn being illustrated by the circles 506A, 506B. That is to say, the respective electrical angle value $\varphi'=k*\varphi=5*\varphi$ differs at these points. The electrical angle is $\varphi'\approx110°$ at a first point 506A and the electrical angle is $\varphi'\approx290°$ at a second point 506B. The different angle values result from the ratio of the signal amplitudes M1/M2 having a periodicity of 180° while, in contrast, the sawtooth curve 505 of the electrical rotation angle $\varphi'$ has a periodicity of 360°/5=72°, this in turn being incompatible with 180°. That is to say, the ratio M1/M2 has a 2-fold periodicity and the electrical rotation angle has a 5-fold periodicity and the numbers 2 and 5 do not have any common whole-number divisor.

In principle, it can be established in this respect that, given an uneven-numbered factor k, the mechanical rotation angle φ can be unambiguously determined in the range of 0° to 360° by way of the electrical rotation angles φ1', φ2' and the signal amplitudes M1, M2 being combined with one another. Given an uneven-numbered factor k, the mechanical rotation angle co can be unambiguously determined only in a range of 0° to 180° by way of the electrical rotation angles φ1', φ2' and the signal amplitudes M1, M2 being combined with one another.

The concept described herein functions, for example, with three non-astatic single pickup coils per pickup coil arrangement, wherein the single pickup coils are rotated through an angle of rotation α=360°/k/3 in relation to one another. The concept described herein also functions with two astatic single pickup coils per pickup coil arrangement, wherein the single pickup coils are rotated through an angle of rotation α=360°/k/4 in relation to one another.

Expressed somewhat more generally, the concept described herein functions, for example, with a pickup coil arrangement with an uneven number it of single pickup coils that are rotated through 1/n-th of the period, i.e. through an angle of rotation α=360°/k/n, in relation to one another. In addition, the concept described herein functions, for example, with a pickup coil arrangement with an even number it of single pickup coils that are rotated through 1/(2*rt) of the period, i.e. through an angle of rotation α=360°/k/(2*rt), in relation to one another.

According to conceivable exemplary embodiments, the evaluation circuit 500 can therefore be configured in order to extract from the first pickup coil arrangement 200 a first angle signal φ1' and a first signal amplitude M1, and in order to extract from the second pickup coil arrangement 300 a second angle signal φ2' and a second signal amplitude M2, and in order to ascertain, on the basis of a combination of the first and the second angle signal φ1', φ2' and also the first and second signal amplitudes M1, M2, a rotation angle φ between the stator component and the rotor component.

In practice, the signal amplitudes M1, M2 may be dependent on the air gap and also on other parameters, such as, for example, the frequency and the conductivity of the inductive target 100 etc. For this reason, one conceivable exemplary embodiment makes provision for the two signal amplitudes M1 and M2 to be placed in a relationship with one another or for the ratio M1/M2 of the two signal amplitudes to be calculated.

Figure 5:
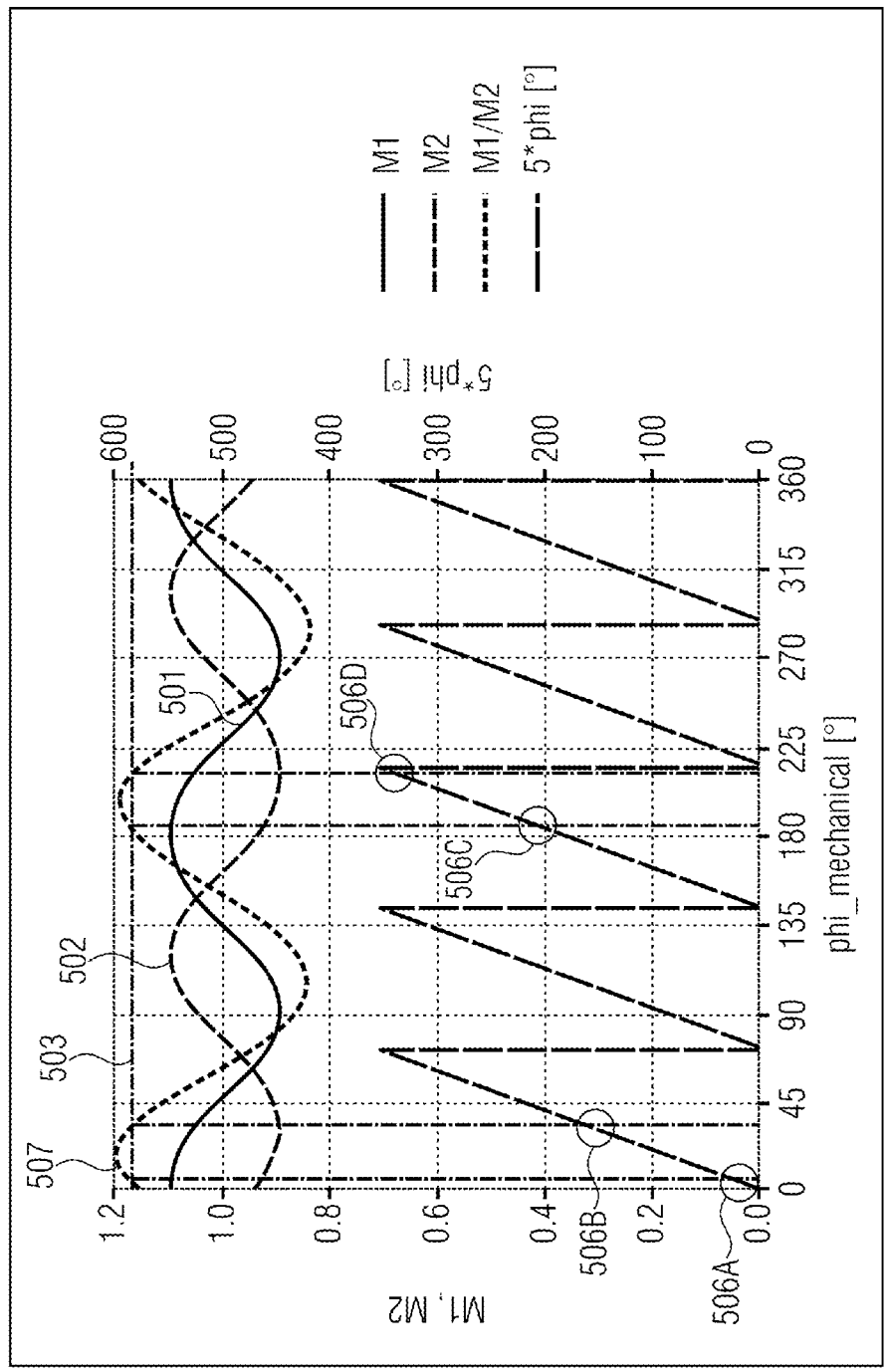
FIG. 5 shows an exemplary plot of two fluctuating signals and a further signal, that depicts the ratio of the two fluctuating signals, and also an electrical angle signal of two elliptically stretched coils that are offset through 60° with respect to one another and have an uneven-numbered k-fold symmetry.

FIG. 5 shows an exemplary plot in which the ratio M1/M2 of the two signal amplitudes is illustrated in the form of the curve 507. However, here, not only two points 506A, 506B have the same amplitude ratio M1/M2, but rather four points, i.e. 506A, 506B, 506C and 506D. As can be seen, all these points are, however, unambiguous since they differ in respect of the electrical angle phi', and therefore an unambiguous mechanical angle value φ can be derived.

According to one exemplary embodiment of this kind, the evaluation circuit 500 for example can therefore be configured in order to combine the first and the second signal amplitude M1, M2 with one another by way of the first and the second signal amplitude M1, M2 being placed in a relationship with one another M1/M2, i.e. by way of the ratio M1/M2 of the two signal amplitudes being calculated, and in order to ascertain, on the basis of this relationship M1/M2 between the signal amplitudes, the rotation angle co between the stator component and the rotor component.

Moreover, all the statements made with respect to the evaluation circuit 500 also apply when only one of the two pickup coil arrangements 200, 300 is elliptically stretched and the respectively other one of the two pickup coil arrangements 200, 300 is not elliptically stretched but rather its envelope has a strict k-fold symmetry. In this case, one of the two signals 501, 502 in the plots discussed up until now would not have any such pronounced fluctuating signal amplitudes, or even no fluctuating signal amplitudes at all, i.e. a signal amplitude would be constant over the entire rotation angle and only the respectively other signal amplitude would vary, as illustrated in the plots. If the evaluation circuit 500 calculates the ratio of the two signal amplitudes M1/M2, the amplitude of the curve 507 (FIG. 5) would likewise turn out to be smaller (approximately half the size since one of the two signal amplitudes M1, M2 does not vary), but the evaluation circuit 500 could nevertheless ascertain the same result for the mechanical rotation angle φ. One advantage would be that the pickup coil arrangement 200, 300 without elliptical stretching could determine the electrical angle phi'=phi/k more precisely, i.e. the systematic angle error would be reduced.

Figure 6:
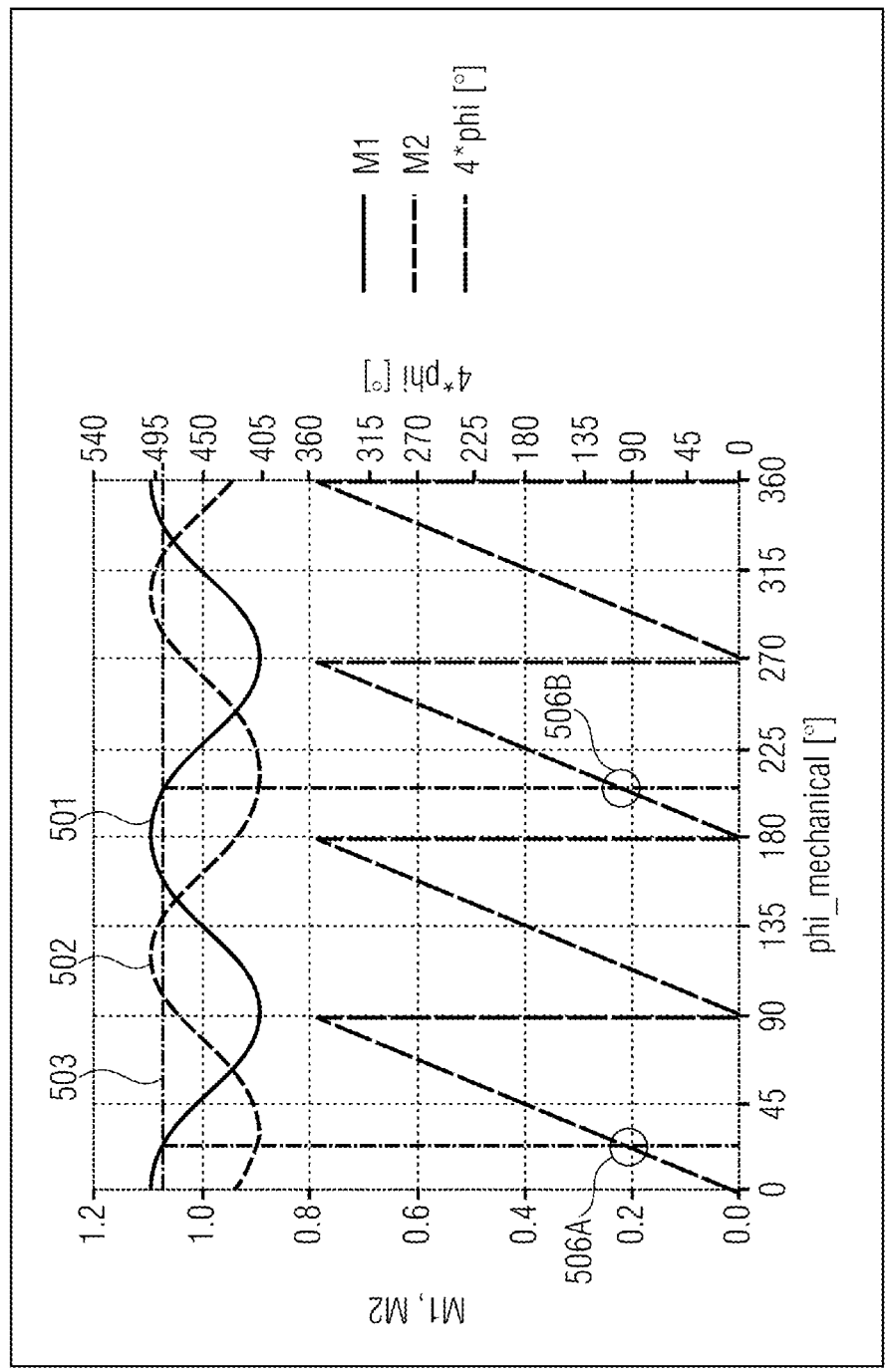
FIG. 6 shows an exemplary plot of two fluctuating signals and also an electrical angle signal of two elliptically stretched coils that are offset through 60° with respect to one another and have an even-numbered k-fold symmetry.

FIG. 6 shows a further exemplary plot that shows the signals of an inductive angle sensor with a target 100 with 4-fold symmetry and also with two pickup coil arrangements 200, 300 each with 4-fold symmetry. It can be seen here that the same electrical angle φ' (here: ≈90°) is identified at each of the positions 506A, 506B. Therefore, ambiguity exists here and the evaluation circuit 500 cannot unambiguously distinguish whether the point is point 506A or point 506B.

Therefore, an unambiguity accordingly exists, given an even-numbered factor k, only in an angle interval of 0° to 180°, but not in an angle interval of 0° to 360°. However, unambiguous determination of the mechanical angle without ambiguities of this kind is always provided given an uneven-numbered factor k.

Figure 7:
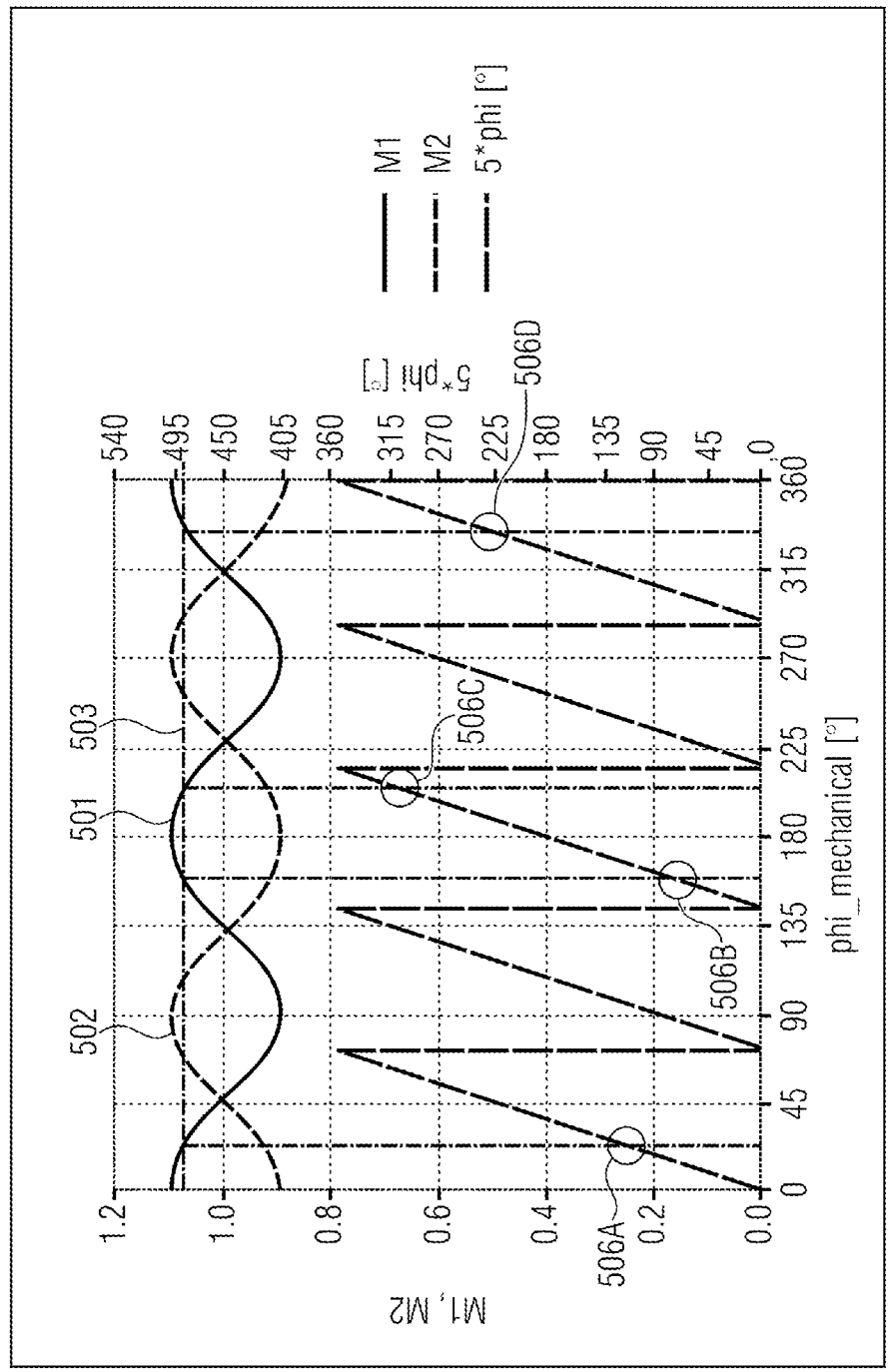
FIG. 7 shows an exemplary plot of two fluctuating signals and also an electrical angle signal of two elliptically stretched coils that are offset through 90° with respect to one another and have an uneven-numbered k-fold symmetry.

FIG. 7 shows, for example, a plot that is comparable to FIG. 6, but with a target and corresponding elliptically stretched pickup coil arrangements each with 5-fold symmetry (k=5), wherein the stretching axes of the elliptically stretched pickup coil arrangements are offset through 90°. It can be seen here that a specific amplitude ratio M1/M2 (see line 503) can be mapped onto four different electrical angles 506A, 506B, 506C, 506D. Here, a first electrical angle 506A is located in the interval [0°, 90°], a second electrical angle 506B is located in the interval [90°, 180°], a third electrical angle 506C is located in the interval [180°, 270°], and a fourth electrical angle 506D is located in the interval [270°, 360°]. Therefore, the mechanical angle co can be unambiguously determined over a complete revolution of 360°.

Figure 8:
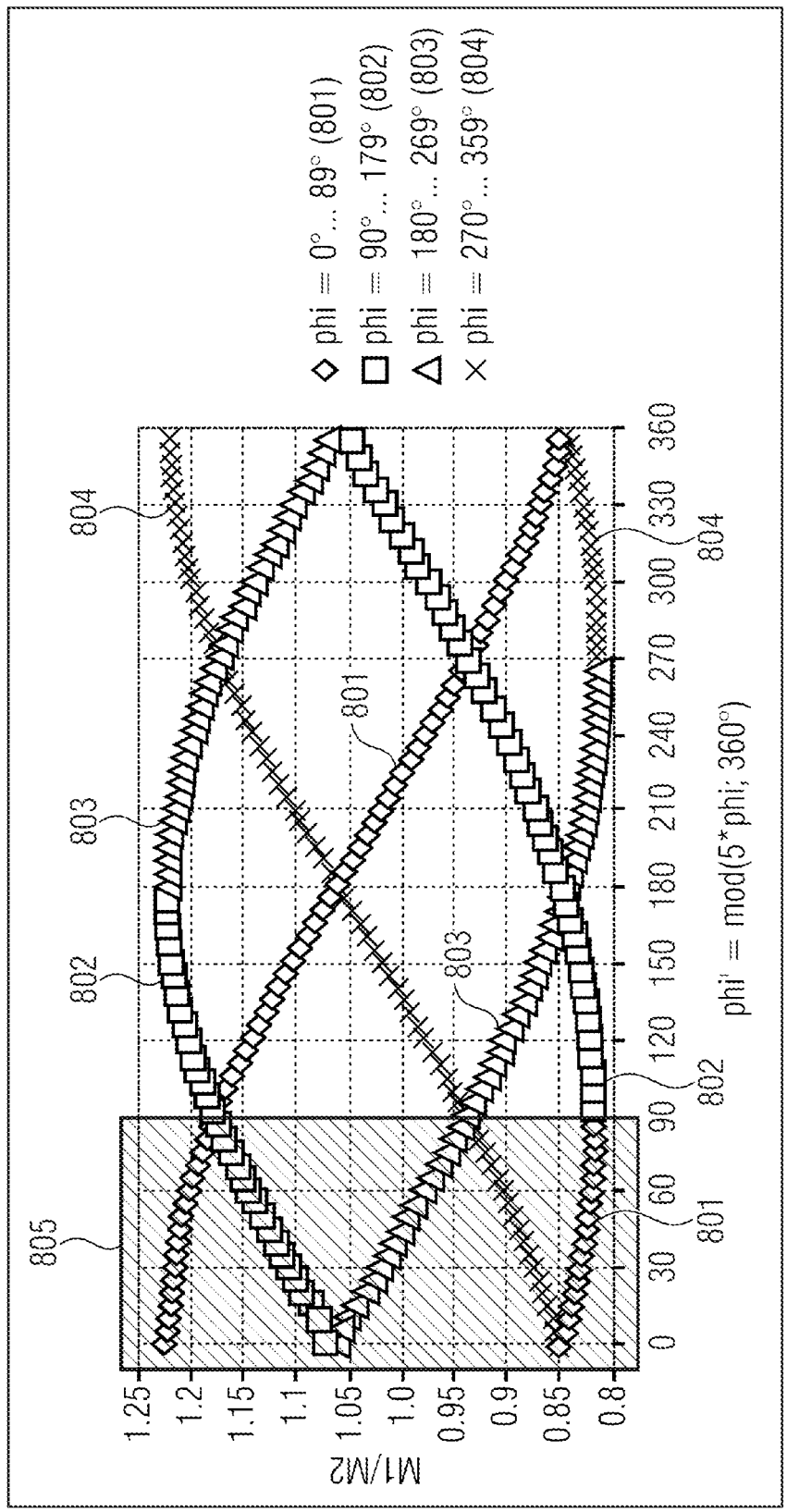
FIG. 8 shows an exemplary plot of a plurality of electrical angle signals in four different angle intervals.

The four values for the electrical angle φ' are φ0', 180°−φ0', 180°+φ0', 360°−φ0'. The angle sensor, and in particular the evaluation circuit 500, can use an interpolation formula, table or curve in order to place the respective electrical angle φ0' in a relationship with the amplitude ratio M1/M2. FIG. 8 first shows a plot of the amplitude ratio M1/M2 for angle positions in the intervals [0°,90], [90°,180°], [180°,270°], [270°,360°]. For the detail illustrated in the semitransparent box 805, an interpolation curve can now be ascertained in order to place the respective electrical angle φ0' in a relationship with the amplitude ratio M1/M2. From this, in combination with the ascertained electrical angle phi', the angle position can be unambiguously ascertained in the interval [0°,360°].

Figure 9:
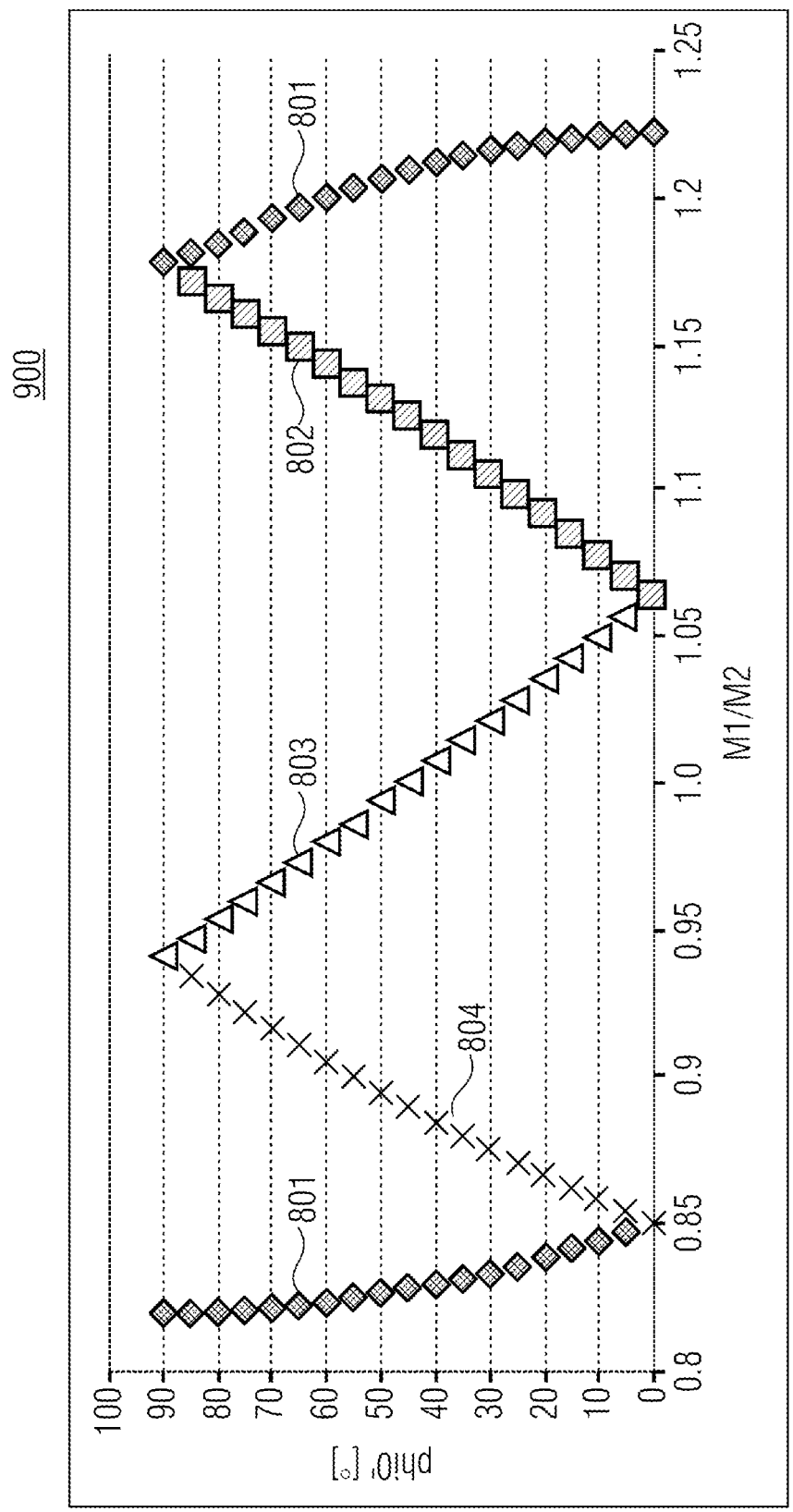
FIG. 9 shows an interpolation curve that can be derived from the angle signals according to FIG. 8.

FIG. 9 shows such an interpolation curve 900 that has been derived from FIG. 8. The evaluation circuit 500 is configured in order to calculate the amplitude ratio M1/M2. The electrical angle φ0' can then be derived from the interpolation curve 900. Following this, the values for the electrical angle φ0' in the corresponding intervals φ0', 180°−φ0', 180°+φ0', 360°−φ0' can be calculated. Following this, all values can be ascertained, e.g. as follows (here using the example: k=5):

abs(φ0'−(φ'+n*360°/5))

abs(180°−φ0'−(φ'+n*360°/5))

abs(180°+φ0'−(φ'+n*360°/5))

abs(360°−φ0'−(φ'+n*360°/5))

... where n=0, 1, 2, 3, 4.

Following this, the evaluation circuit 500 can determine the smallest value that has been ascertained in this case where n=n0. Finally, the evaluation circuit 500 can determine the rotation angle using this in accordance with: φ0'+n0*360°/5.

However, the interpolation curve 900 shown in FIG. 9 shows a possible difficulty since the diamond-shaped (blue) curves 801 are relatively steep. This means that a small error in the amplitude ratio M1/M2 leads to large errors in ascertaining the electrical angle φ0, and this can in turn have an adverse effect on the entire angle measurement or even render it invalid.

This situation can be taken into account by the exemplary embodiment, already described above, of an inductive angle sensor in which a third pickup coil arrangement 400 is present. The third pickup coil arrangement 400 can be identical to the second pickup coil arrangement 300, wherein the third pickup coil arrangement 400 can be rotated around the common axis of rotation R in relation to the second pickup coil arrangement 300 in such a way that, in FIG. 9, an amplitude ratio M3/M2 moves to the value 1 when the amplitude ratio M1/M2 lies close to its extreme values, and vice versa. Here, M3 is the amplitude of the signal of the third pickup coil arrangement 400. This phase relationship can be achieved when M1, M2 and M3 are spaced apart through 120° in the electrical angle domain, i.e. when in each case two adjacent pickup coil arrangements 200, 300, 400 are rotated through 60° in the mechanical angle domain in relation to one another.

The amplitudes of the signals of the curves illustrated in FIGS. 8 and 9 have been calculated using root functions. However, the computational complexity can be reduced by way of replacing the root calculation. For example, instead of the simple amplitude values M1, M2, M3, their squares M1^2, M2^2, M3^2 can be used, this leading to a modified interpolation curve 900 which, however, has very similar properties.

A further conceivable exemplary embodiment with three pickup coil arrangements 200, 300, 400 provides that the evaluation circuit 500 does not calculate the amplitude ratios but rather differences between the amplitudes, e.g. M1−M2 and M2−M3 and M3−M1, wherein the last-mentioned difference follows from a subtraction of the previous differences, so that this is redundant and can be omitted. These subtractions are similar to sinusoidal curves with 180° mechanical periodicity. Therefore, the evaluation circuit 500 can apply the arctangent function (arctan$_2$), already mentioned above, to these signals as well, specifically in the same way as has been explained above with the raw signals U1, V1, W1, in order to calculate an angle. This angle is denoted by φM below. The evaluation circuit can combine the angles φ1 (of U1, V1, W1) and φM (of M1−M2, M2−M3, M3−M1) with one another in order to obtain an unambiguous angle value in the range of 0° to 360°.

According to such an exemplary embodiment, the evaluation circuit 500 can therefore be configured in order to combine the first, the second and the third signal amplitude M1, M2, M3 with one another by way of calculating at least the difference between the first and the second signal amplitude M1−M2 and also the difference between the second and the third signal amplitude M2−M3 (and optionally the difference between the third and the first signal amplitude M3−M1), and in order to ascertain, on the basis of these differences between the signal amplitudes, the rotation angle between the stator component and the rotor component.

An alternative exemplary embodiment, likewise already described further above in respect of structure, of the inductive angle sensor provides that only an individual pickup coil arrangement 200 is provided. This individual pickup coil arrangement 200 can have three single pickup coils 201, 202, 203 that are rotated in relation to one another. Each of these single pickup coils 201, 202, 203 can be elliptically stretched. A difference from the embodiments discussed above is therefore that all single pickup coils 201, 202, 203 of a pickup coil arrangement 200 are stretched in different directions (i.e. along different stretching axes), and not in the same direction, as would be the case if the entire pickup coil arrangement 200 were stretched along one stretching axis.

Accordingly, the evaluation circuit 500 can be configured to use such a system with three single pickup coils 201, 202, 203 stretched in different directions in order to ascertain the rotation angle of the rotor relative to the stator. This is intended to be discussed below using a non-limiting example of three single pickup coils U, V, W with 5-fold symmetry (k=5).

Each of these three single pickup coils U, V, W can have a stretching factor $\psi_{Coil}$ of $\psi_{Coil} \geq 1.10$, i.e. stretched by 10% in relation to a circular shape. In each case two adjacent single pickup coils U, V, W can each be rotated through the angle of rotation $\alpha=360°/k/3$, i.e. through $360°/5/3=24°$, in relation to one another. The first single pickup coil U can be elliptically stretched along a first stretching axis 101, the second single pickup coil V can be elliptically stretched along a second stretching axis 102, and the third single pickup coil W can be stretched along a third stretching axis 103. In each case two adjacent stretching axes can be arranged at an angle of $20° \leq \varepsilon \leq 90°$, or in this non-limiting example at an angle of $\varepsilon=60°$, with respect to one another. Therefore, accordingly, in each case two adjacent single pickup coils would also be elliptically stretched with a respective 60° spacing. For example, the first single pickup coil U could be stretched in the −60° direction, the second single pickup coil V in 0° direction and the third single pickup coil W in the +60° direction.

In this case, the signals in the three single pickup coils U, V, W could be determined as follows:

$Ut(t) = \{amp + [1 + del^* \sin(2^*phi)]^* \sin(5^*phi)\}^* \sin(2^*pi^*f^*t)$ $Vt(t) = \{amp + [1 + del^* \sin(2^*(phi + kappa))]^* \sin(5^*(phi + 24°))\}^* \sin(2^*pi^*f^*t)$ $Wt(t) = \{amp + [1 + del^* \sin(2^*(phi - kappa))]^* \sin(5^*(phi - 24°))\}^* \sin(2^*pi^*f^*t)$ Here, the term del=0.1 denotes the amount of stretching by 10%, phi denotes the mechanical rotation angle φ, kappa=60° denotes the direction in which the respective single pickup coil is stretched, and the term amp denotes a signal component that is induced in the single pickup coils independently of the rotor position (this signal component is coupled directly by the field coil into the non-astatic single pickup coils). The 24° angles originate from the rotation of in each case two adjacent single pickup coils by the factor 360°/k/3, and the factor 5 denotes the k-fold symmetry, that is to say k=5 here. The term $\sin(2^*pi^*f^*t)$ denotes the carrier frequency f=4 MHz. It should once again be explicitly mentioned at this point that this example is merely a non-limiting example in order to explain the calculation rules. The calculation rules described herein of course also apply, as it were, to numerical values other than the specific numerical values cited in this example. This applies, in particular, to the factor k of the k-fold symmetry and also to the factor kappa, which indicates the stretching direction, and also to the stretching factor $\psi_{Coil}$, which indicates the amount of elliptical stretching of the respective single pickup coil.

After amplitude demodulation of the signals Ut, Vt, Wt, the signals U, V, W are obtained in accordance with:

$U = amp + (1 + del^* \sin(2^*phi))^* \sin(5^*phi)$ [Eq. X1]

$V = amp + (1 + del^* \sin(2^*(phi + kappa)))^* (-0.5^* \sin(5^*phi) + sqrt(3)/2^* \cos(5^*phi))$ [Eq. X2]

$W = amp + (1 + del^* \sin(2^*(phi - kappa)))^* (-0.5^* \sin(5^*phi) - sqrt(3)/2^* \cos(5^*phi))$ [Eq. X3]

The evaluation circuit 500 can then calculate the electrical angle phi5' in accordance with:

$phi5' = \arctan 2(2^*U - V - W; sqrt(3)^*(V - W))$ [Eq. Y1]

On account of the subtractions, the common terms amp cancel each other out, i.e. they are irrelevant in this consideration. The calculated electrical angle phi5' is identical to 5*(phi+dphi), where phi is the exact mechanical angle and dphi denotes a systematic angle error. Such a systematic angle error can be measured for inductive angle sensors and be stored in the form of a correction formula or correction table. Therefore, the evaluation circuit 500 can calculate the mechanical angle phi5 in accordance with: phi5=phi5'−5*dphi.

The evaluation circuit can also ascertain a further electrical angle phi2', specifically in accordance with:

$phi2' = \arctan_2(XX; YY)$ $XX = 0.5^* \sin(2^*kappa)(U - V)^*(\sin(phi5) + sqrt(3)^* \cos(phi5)) +$ $(U - W)^*(\sin(phi5) - sqrt(3)^* \cos(phi5) + 3^* \cos^2(phi5) - 3^* \sin^2(phi5)$ $YY = (W - U)^*(\sin(phi5)^*(1 + 0.5^* \cos(2^*kappa) -$ $sqrt(3)/2^* \cos(2^*kappa)^* \cos(phi5)) +$ $(U - V)^*(\sin(phi5)^*(1 + 0.5^* \cos(2^*kappa) +$ $sqrt(3)/2^* \cos(2^*kappa)^* \cos(phi5) 0.25^* sqrt(3)^*$ $\sin(2^* phi5)^*(-3^* \cos(2^*kappa) + 2 + \cos(2^*kappa)$ These calculation rules are obtained by way of replacing 5*phi with phi5, inserting this into the above equations Eq. X1, Eq. X2 and Eq. X3 and solving for cos(2*phi) and sin(2*phi). Canceling out identical factors in the expressions for cos(2*phi) and sin(2*phi) leads to the terms XX and YY. It should once again be explicitly mentioned at this point that this example is merely a non-limiting example in order to explain the calculation rules. The calculation rules described herein of course also apply, as it were, to numerical values other than the specific numerical values cited in this example. This applies, in particular, to the factor k of the k-fold symmetry and also to the factor kappa, which indicates the stretching direction, and also to the stretching factor $\psi_{Coil}$, which indicates the amount of elliptical stretching of the respective single pickup coil.

Figure 10:
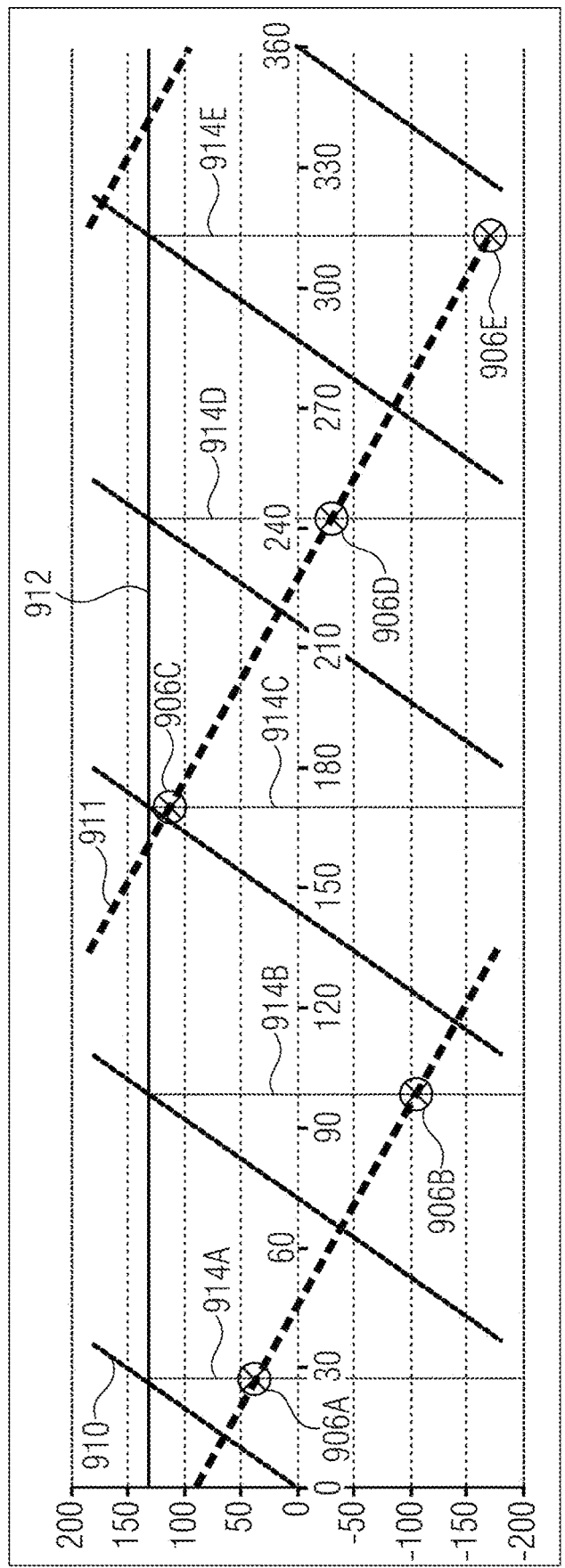
FIG. 10 shows a plot of two electrical angle signals that allow angle determination in accordance with the Vernier principle.

FIG. 10 shows a result of the above calculation rules. The mechanical angle is plotted on the horizontal axis. The vertical axis characterizes the first electrical angle phi5' (see the curves 910 running from bottom left to top right) and also the second electrical angle phi2' (see the curves 911 running from top left to bottom right). The curves of the two electrical angles phi2' and phi5' substantially describe a sawtooth voltage, similar to the sawtooth voltages discussed above with reference to FIGS. 4 to 7. It can be seen in FIG. 10 that the two curves 910, 911 implement a Vernier principle. A comparison of the two curves 910, 911 allows the evaluation circuit 500 to ascertain the rotor position unambiguously over a complete mechanical revolution of 360°.

As a non-limiting example, it is assumed that the first electrical angle phi5' is approximately 140° (see the thin horizontal line 912). This line 912 crosses the sawtooth curve 910 of the second electrical angle phi5' at five points (see the vertical lines 914A, . . . , 914E) on account of the 5-fold symmetry (k=5) assumed here by way of example. These vertical lines 914A, . . . , 914E in turn cross the sawtooth curve 911 of the second electrical angle phi2' accordingly at likewise five points, which are denoted by the reference signs 906A, . . . , 906E here. These five points 906A, . . . , 906E have unambiguously distinguishable values, they are equally spaced apart from one another and no two of said points are close to one another. Therefore, there is no risk of the evaluation circuit misinterpreting two values if small errors are present. Therefore, with the aid of the second electrical angle phi2', the evaluation circuit 500 can unambiguously determine the global rotor position in the mechanical angle domain.

The innovative concept described herein allows an inductive angle sensor to be provided, which inductive angle sensor has an individual solid, weighted metal rotor target 100, which is stable in respect of rotation speed, and allows unambiguous determination of the global rotor position over a complete revolution of 360° in the mechanical angle domain.

Therefore, in summary, it is possible to establish that conventional angle sensors with k-fold symmetry and therefore k-fold periodicity restrict the unambiguously determinable angle range to a range of 0° to 360°/k. This is the case particularly for rapidly rotating angle sensors that have to use a solid metal target since only solid targets of this kind are stable in respect of rotation speed. Approaches in which a Vernier principle is implemented by means of two targets with different k-fold symmetry do exist. Although these can resolve the ambiguities in the angle range, the targets cannot be embodied as solid metal targets in this case since they would then interfere with one another. Instead, the targets have to be implemented in the form of coils here. However, the coils are once again unsuitable for use at high rotational speeds.

Therefore, the innovative concept described herein proposes a solution to this by way of providing an inductive angle sensor that is configured in order to unambiguously ascertain the global rotor position over a complete revolution of 360° in the mechanical angle domain and at the same time allows the use of targets that are stable in respect of high rotation speeds.

In order to solve this problem, this description proposes stretching the target in one direction (i.e. along a stretching axis), so that the contour outline, as seen in plan view, of the inductive target has an elliptical shape. It is also proposed to stretch at least two single pickup coils in one direction (i.e. along a stretching axis), so that the contour outline, as seen in plan view, of the respective single pickup coil has an elliptical shape.

Here, the single pickup coils can belong to the same pickup coil arrangement. The pickup coil arrangement can be stretched along one stretching axis, so that the two single pickup coils are likewise stretched along this stretching axis. As an alternative, each of the single pickup coils can be stretched along a different stretching axis, so that the two single pickup coils are elliptically stretched in different directions. In addition, a second pickup coil arrangement can optionally be provided. This second pickup coil arrangement can likewise be elliptically stretched along a further stretching axis. However, as an alternative, this second pickup coil arrangement can also be non-stretched and have a circular shape.

As a further alternative, one of the two single pickup coils can belong to a first pickup coil arrangement, and the respectively other of the two single pickup coils can belong to a second pickup coil arrangement. The two pickup coil arrangements can each be stretched along a different stretching axis here. However, as an alternative, the second pickup coil arrangement can also be non-stretched and have a circular shape here.

Where the elliptically longitudinally stretched contour outline of the target and the elliptically longitudinally stretched contour outline of a pickup coil arrangement overlap, this leads to an amplified signal in comparison to a non-elliptically stretched coil with a circular shape.

The target can have, for example, a k-fold symmetry and be stretched by at least 10%, or by at least 20%, along a first stretching axis 101 in a first direction. A first pickup coil arrangement 200 with, for example, three single pickup coils 201, 202, 203 each with k-fold symmetry can be elliptically stretched by at least 10%, or by at least 20%, along a second stretching axis 102 in a second direction. A second pickup coil arrangement 300 with, for example, three single pickup coils 301, 302, 303 each with k-fold symmetry can be elliptically stretched by at least 10%, or by at least 20%, along a third stretching axis 102 in a third direction. The second and the third stretching axis 102, 103 can be arranged at an angle of 20°≤ε≤90°, or at an angle of ε=60°, with respect to one another.

The evaluation circuit 500 can extract a first electrical angle phi1' from the first pickup coil arrangement 200. The evaluation circuit 500 can extract a second electrical angle phi2' from the second pickup coil arrangement 300. The evaluation circuit 500 can further extract a first item of amplitude information M1 from the first pickup coil arrangement 200. The evaluation circuit 500 can further extract a second item of amplitude information M2 from the second pickup coil arrangement 300. The evaluation circuit 500 can combine the two electrical angles phi1' and phi2' and also the two items of amplitude information M1 and M2 with one another in order to obtain in this way an unambiguous item of angle information, e.g. in the form of the electrical global angle phi', that allows a conclusion to be drawn about the current rotor position.

The concept described herein functions best with an uneven-numbered factor k, i.e. for example for coils with 3-fold, 5-fold or 7-fold symmetry. However, the concept described herein can also be used for coils with an even-numbered factor k.

Some exemplary embodiments provide an inductive angle sensor that has at least one first single pickup coil of weak k-fold symmetry that is stretched by a first amount in a first direction perpendicular to the axis of rotation, and also at least one second single pickup coil of weak k-fold symmetry that is stretched by a second amount in a second direction perpendicular to the axis of rotation. The inductive angle sensor further has a rotatable target of weak k-fold symmetry that is stretched by a third amount in a third direction perpendicular to the axis of rotation. The inductive angle sensor additionally has a field coil that can be excited by means of an alternating electric current (e.g. at frequencies of 1 KHz<f<1 GHz). The respective center of symmetry of the first and second single pickup coils and also of the target is the axis of rotation. The inductive angle sensor further has an evaluation circuit that is configured in order to demodulate the envelope of these amplitude-modulated RF signals of the respective single pickup coils and to ascertain, on the basis of this, the rotor position or the rotation position of the target.

The factor k can be an uneven-numbered natural number (integer).

The first single pickup coil can be a single pickup coil from amongst a first group of single pickup coils. The second single pickup coil can be a single pickup coil from amongst a second group of single pickup coils. All single pickup coils of the first group can be rotated through a first angle relative to one another, and all single pickup coils of the second group can be rotated through a second angle relative to one another. The single pickup coils of the first group can be rotated through a third angle in relation to the single pickup coils of the second group. The third angle can be larger than the first angle and larger than the second angle.

The evaluation circuit can ascertain the amplitude M1 of the signals that is induced in the first group of single pickup coils to which the first single pickup coil also belongs. The evaluation circuit can also ascertain the amplitude M2 of the signals that is induced in the second group of single pickup coils to which the second single pickup coil also belongs. The evaluation circuit can determine the ratio M1/M2 of the two amplitudes, or the evaluation circuit can calculate the arctangent (arctan 2) of the two amplitudes M1 and M2.

The above-described exemplary embodiments constitute merely an illustration of the principles of the innovative concept described herein. It is self-evident that modifications and variations of the arrangements and details described herein will be apparent to other technical experts. Therefore, the intention is that the concept described herein is limited only by the scope of protection of the following patent claims and not by the specific details that have been presented herein on the basis of the description and the explanation of the exemplary embodiments.

Although some aspects have been described in connection with an apparatus, it goes without saying that these aspects are also a description of the corresponding method, which means that a block or an element of an apparatus is also intended to be understood to mean a corresponding method step or to mean a feature of a method step. Similarly, aspects that have been described in connection with or as a method step are also a description of a corresponding block or detail or feature of a corresponding apparatus.

What is claimed is:

1. An inductive angle sensor, comprising:
   a stator component; and
   a rotor component that is rotatable relative to the stator component about a common axis of rotation,
   wherein the rotor component has an inductive target with k-fold symmetry,
   wherein the stator component has a first single pickup coil with k-fold symmetry and a second single pickup coil with the same k-fold symmetry, wherein the first single pickup coil is rotated around the common axis of rotation in relation to the second single pickup coil such that a first geometry of the first single pickup is rotationally offset with respect to a second geometry of the second single pickup around the common axis of rotation by a rotation angle that is greater than zero,
   wherein the inductive target comprises a first contour outline, as seen in plan view, that has a first elliptical shape, and
   wherein first single pickup coil comprises a second contour outline, as seen in the plan view, that has a second elliptical shape.

2. The inductive angle sensor as claimed in claim 1,
   wherein the stator component has a first pickup coil arrangement with a first plurality of single pickup coils and has a second pickup coil arrangement that is rotated around the common axis of rotation with respect to the first pickup coil arrangement and has a second plurality of single pickup coils,
   wherein the first single pickup coil and the second single pickup coil belong to the first pickup coil arrangement, and wherein the first pickup coil arrangement comprises a third contour outline, as seen in the plan view, that has a third elliptical shape.

3. The inductive angle sensor as claimed in claim 1,
   wherein the stator component has a first pickup coil arrangement with a first plurality of single pickup coils and has a second pickup coil arrangement that is rotated around the common axis of rotation with respect to the first pickup coil arrangement and has a second plurality of single pickup coils,
   wherein the first single pickup coil belongs to the first pickup coil arrangement, and wherein the second single pickup coil belongs to the second pickup coil arrangement,
   wherein the first pickup coil arrangement comprises a third contour outline, as seen in the plan view, that has a third elliptical shape, and
   wherein the second pickup coil arrangement comprises a fourth contour outline, as seen in the plan view, that has a fourth elliptical shape.

4. The inductive angle sensor as claimed in claim 3,
   wherein the first pickup coil arrangement has a k-fold symmetry with an uneven-numbered factor k, and
   wherein the second pickup coil arrangement likewise has a k-fold symmetry with an uneven-numbered factor k.

5. The inductive angle sensor as claimed in claim 3,
   wherein the third elliptical shape is rotationally offset with respect to the fourth elliptical shape around the common axis of rotation.

6. The inductive angle sensor as claimed in claim 2, further comprising:
   an evaluation circuit that is configured to extract from the first pickup coil arrangement a first angle signal and a first signal amplitude, and extract from the second pickup coil arrangement a second angle signal and a second signal amplitude, and
   wherein the evaluation circuit determines based on a combination of the first angle signal and the second angle signal and also the first signal amplitude and the second signal amplitude, a rotation angle between the stator component and the rotor component.

7. The inductive angle sensor as claimed in claim 6,
   wherein the evaluation circuit is configured to combine the first signal amplitude and the second signal amplitude with one another by dividing the first signal amplitude by the second signal amplitude to obtain a quotient, and
   wherein the evaluation circuit determines the rotation angle between the stator component and the rotor component based on the quotient.

8. The inductive angle sensor as claimed in claim 1,
   wherein the stator component has an individual pickup coil arrangement with at least two elliptical single pickup coils that are stretched in different directions, wherein the first and the second single pickup coils belong to the individual pickup coil arrangement,
   wherein the second elliptical shape that is elongated in a first direction, and
   wherein the second single pickup coil comprises a third contour outline, as seen in the plan view, that has a third elliptical shape, wherein the third elliptical shape is elongated in a second direction that is different from the first direction.

9. The inductive angle sensor as claimed in claim 1,
   wherein the stator component has an individual pickup coil arrangement with at least three elliptical single pickup coils that are stretched in different directions, wherein the individual pickup coil arrangement comprises the first single pickup coil, the second single pickup coil, and a third single pickup coil, wherein the second elliptical shape is stretched in a first direction, wherein the second single pickup coil is stretched along a third axis that runs perpendicularly to the common axis of rotation so that the contour outline, as seen in plan view, of the second single pickup coil has an elliptical shape that is stretched in a second direction comprises a third contour outline, as seen in the plan view, that has a third elliptical shape, wherein the third elliptical shape is stretched in a second direction that is different from the first direction, and wherein the third single pickup coil comprises a fourth contour outline, as seen in the plan view, that has a fourth elliptical shape, wherein the fourth elliptical shape is stretched in a third direction that is different from the first direction and the second direction.

10. The inductive angle sensor as claimed in claim 3, wherein the second elliptical shape and the third elliptical shape are rotationally offset around the common axis of rotation at an angle ε of more than 360°/k with respect to one another.

11. The inductive angle sensor as claimed in claim 3, wherein the second elliptical shape and the third elliptical shape are rotationally offset around the common axis of rotation at an angle ε of 20°≤ε≤90°, or at an angle of ε=60°, with respect to one another.

12. The inductive angle sensor as claimed in claim 1, wherein the stator component has a first pickup coil arrangement with a first plurality of single pickup coils, a second pickup coil arrangement with a second plurality of single pickup coils, and a third pickup coil arrangement with a third plurality of single pickup coils, wherein the first, the second, and the third pickup coil arrangements are rotationally offset about the common axis of rotation in relation to one another, wherein the first single pickup coil belongs to the first pickup coil arrangement and the second single pickup coil belongs to the second pickup coil arrangement, wherein the first pickup coil arrangement comprises a third contour outline, as seen in the plan view, that has a third elliptical shape, and wherein the second pickup coil arrangement comprises a fourth contour outline, as seen in the plan view, that has a fourth elliptical shape that is rotationally offset about the common axis of rotation from the third elliptical shape, and wherein the third pickup coil arrangement comprises a fifth contour outline, as seen in the plan view, that has a fifth elliptical shape that is rotationally offset about the common axis of rotation from the third elliptical shape and the fourth elliptical shape.

13. The inductive angle sensor as claimed in claim 12, wherein the first pickup coil arrangement, the second pickup coil arrangement, and the third pickup coil arrangement are each stretched in directions that are different from one another.

14. The inductive angle sensor as claimed in claim 12, wherein a major axis of the fourth elliptical shape is arranged at a first angle of more than 360°/k relative to a major axis of the third elliptical shape so that the first pickup coil arrangement and the second pickup coil arrangement are each stretched in different directions, and wherein the third axis major axis of the fourth elliptical shape is arranged at a second angle of more than 360°/k relative to a major axis of the fifth elliptical shape so that the second pickup coil arrangement and the third pickup coil arrangement are each stretched in different directions.

15. The inductive angle sensor as claimed in claim 12, wherein a major axis of the fourth elliptical shape is arranged at an angle e of 20°≤ε≤90°, or at an angle of ε=60°, relative to a major axis of the third elliptical shape or relative to a major axis of the fifth elliptical shape.

16. The inductive angle sensor as claimed in claim 12, further comprising:

an evaluation circuit that is configured to extract from the first pickup coil arrangement a first angle signal and a first signal amplitude, extract from the second pickup coil arrangement a second angle signal and a second signal amplitude, and extract from the third pickup coil arrangement a third angle signal and a third signal amplitude, and wherein the evaluation circuit is configured to determine based on a combination of the first, the second and the third angle signal and also the first, the second and the third signal amplitude, a rotation angle between the stator component and the rotor component.

17. The inductive angle sensor as claimed in claim 16, wherein the evaluation circuit is configured to combine the first, the second, and the third signal amplitudes with one another by way of calculating a first difference between the first and the second signal amplitude and calculating a second difference between the second and the third signal amplitude, and wherein the evaluation circuit is configured to determine, based on the first difference and the second difference, the rotation angle between the stator component and the rotor component.

18. The inductive angle sensor as claimed in claim 1, wherein the first single pickup coil is stretched with a stretching factor that is at least 1.10, so that the second elliptical shape of the first single pickup coil is stretched along a major axis of the second elliptical shape by at least 10% in relation to a circular shape.

19. The inductive angle sensor as claimed in claim 18, wherein the inductive target has a stretching factor of at least 1.10 so that the first elliptical shape of the inductive target is stretched along a major axis of the first elliptical shape by at least 10% in relation to a circular shape, and wherein the stretching factor of the inductive target is identical to the stretching factor of the first single pickup coil.

20. The inductive angle sensor as claimed in claim 1, wherein the inductive target is configured as an individual, solid shaped metal part.

21. An inductive angle sensor, comprising:

a stator component; and a rotor component that is rotatable relative to the stator component about a common axis of rotation, wherein the rotor component has an inductive target with k-fold symmetry, wherein the stator component has a first single pickup coil with k-fold symmetry and a second single pickup coil with the same k-fold symmetry, wherein the first single pickup coil is arranged with a rotational offset relative to the second single pickup coil such that a first geometry of the first single pickup is rotationally offset with respect to a second geometry of the second single pickup around the common axis of rotation by a rotation angle that is greater than zero, wherein the inductive target comprises a first contour outline, as seen in plan view, that has a first elliptical shape, and wherein the first single pickup coil comprises a second contour outline, as seen in the plan view, that has a second elliptical shape.

\* \* \* \* \*